US010489158B2

(12) United States Patent
Wang et al.

(10) Patent No.: US 10,489,158 B2
(45) Date of Patent: Nov. 26, 2019

(54) PROCESSORS, METHODS, SYSTEMS, AND INSTRUCTIONS TO SELECTIVELY FENCE ONLY PERSISTENT STORAGE OF GIVEN DATA RELATIVE TO SUBSEQUENT STORES

(71) Applicant: INTEL CORPORATION, Santa Clara, CA (US)

(72) Inventors: Cheng Wang, San Ramon, CA (US); Youfeng Wu, Palo Alto, CA (US); Rajesh M Sankaran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/498,178

(22) Filed: Sep. 26, 2014

(65) Prior Publication Data

US 2016/0092223 A1    Mar. 31, 2016

(51) Int. Cl.
*G06F 9/312* (2018.01)
*G06F 9/30* (2018.01)
(Continued)

(52) U.S. Cl.
CPC ........ *G06F 9/30087* (2013.01); *G06F 9/3004* (2013.01); *G06F 9/30043* (2013.01);
(Continued)

(58) Field of Classification Search
CPC ............. G06F 9/30043; G06F 9/30087; G06F 11/1471; G06F 9/3834
See application file for complete search history.

(56) References Cited

U.S. PATENT DOCUMENTS 6,073,210 A  6/2000  Palanca et al.
6,546,462 B1  4/2003  Palanca et al.
(Continued)

FOREIGN PATENT DOCUMENTS

CN  1855033 A  11/2006
CN  104050112 A  9/2014
(Continued)

OTHER PUBLICATIONS

Intel, "IA-64 Application Developer's Architecture Guide", May 1999, p. 4-21 and p. 7-36.*
(Continued)

*Primary Examiner* — David J. Huisman
(74) *Attorney, Agent, or Firm* — Nicholson De Vos Webster & Elliot LLP

(57) ABSTRACT

A processor of an aspect includes a decode unit to decode a persistent store fence instruction. The processor also includes a memory subsystem module coupled with the decode unit. The memory subsystem module, in response to the persistent store fence instruction, is to ensure that a given data corresponding to the persistent store fence instruction is stored persistently in a persistent storage before data of all subsequent store instructions is stored persistently in the persistent storage. The subsequent store instructions occur after the persistent store fence instruction in original program order. Other processors, methods, systems, and articles of manufacture are also disclosed.

23 Claims, 17 Drawing Sheets

(51) Int. Cl.
    *G06F 12/0875* (2016.01)
    *G06F 9/38* (2018.01)
    *G06F 9/46* (2006.01)
    *G06F 12/0804* (2016.01)
    *G06F 12/0815* (2016.01)

(52) U.S. Cl.
    CPC ........ *G06F 9/30145* (2013.01); *G06F 9/3834* (2013.01); *G06F 9/3859* (2013.01); *G06F 9/466* (2013.01); *G06F 12/0804* (2013.01); *G06F 12/0815* (2013.01); *G06F 12/0875* (2013.01); *G06F 2212/452* (2013.01)

(56) References Cited

U.S. PATENT DOCUMENTS

| | | | |
|---|---|---|---|
| 6,678,810 | B1 | 1/2004 | Palanca et al. |
| 6,708,269 | B1 | 3/2004 | Tiruvallur et al. |
| 8,793,475 | B2 | 7/2014 | Peleg et al. |
| 2008/0046736 | A1 | 2/2008 | Arimilli et al. |
| 2010/0106895 | A1 | 4/2010 | Condit et al. |
| 2012/0109895 | A1 | 5/2012 | Zwilling et al. |
| 2012/0254120 | A1* | 10/2012 | Fang ................. G06F 17/30377 707/648 |
| 2014/0052891 | A1 | 2/2014 | Zyulkyarov et al. |
| 2014/0136786 | A1 | 5/2014 | Carpenter et al. |
| 2014/0281196 | A1 | 9/2014 | Dixon et al. |
| 2014/0281240 | A1 | 9/2014 | Willhalm |
| 2014/0281269 | A1* | 9/2014 | Chakrabarti ........ G06F 12/0804 711/142 |
| 2014/0365734 | A1* | 12/2014 | Bridge, Jr. .......... G06F 12/0891 711/144 |
| 2015/0006834 | A1 | 1/2015 | Dulloor et al. |
| 2015/0095578 | A1* | 4/2015 | Doshi ................. G06F 12/0888 711/125 |

FOREIGN PATENT DOCUMENTS

| | | |
|---|---|---|
| JP | 2008-512785 A | 4/2008 |
| TW | 200617680 A | 6/2006 |
| WO | 2008/155829 A1 | 12/2008 |
| WO | 2016/048592 A1 | 3/2016 |

OTHER PUBLICATIONS

Volos et al., "Mnemosyne: Lightweight Persistent Memory", Mar. 2011, 13 pages.*

ArPUG, "Reliability and the Write-Ahead Log", 2 Pages, available at: <http://www.postgresql.org.ar/trac/wiki/FiabilidadWriteAheadLog>, retrieved on Dec. 12, 2014.

International Search Report and Written Opinion received for PCT Patent Application No. PCT/US20151047741, dated Dec. 14, 2015, 14 pages.

Dulloor, et al., "System Software for Persistent Memory", ACM, Apr. 13-16, 2014, 15 pages.

Intel, "Intel Architecture Instruction Set Extensions Programming Reference", Reference No. 319433-020, Jul. 2014, 6 pages.

Office Action received for Taiwanese Patent Application No. 104127169, dated Sep. 10, 2016, 22 Pages of Taiwanese Office Action including 11 pages of English Translation.

Office Action received for Japanese Patent Application No. 2017-510898, dated Mar. 13, 2018, 6 pages of Japanese Office Action including 3 pages of English Translation.

"Intel 64 and IA-32 Architectures Software Developer's Manual", Combined vols. 1, 2A, 2B, 2C, 3A, 3B, and 3C, Order No. 325462-051US, Jun. 2014, 17 pages.

International Preliminary Report on Patentability and Written Opinion received for PCT Application No. PCT/US2015/047741, dated Apr. 6, 2017, 11 pages.

Second Office Action and Search Report from foreign counterpart Chinese Patent Application No. 201580045704.3 dated May 17, 2019, 5 pages.

* cited by examiner

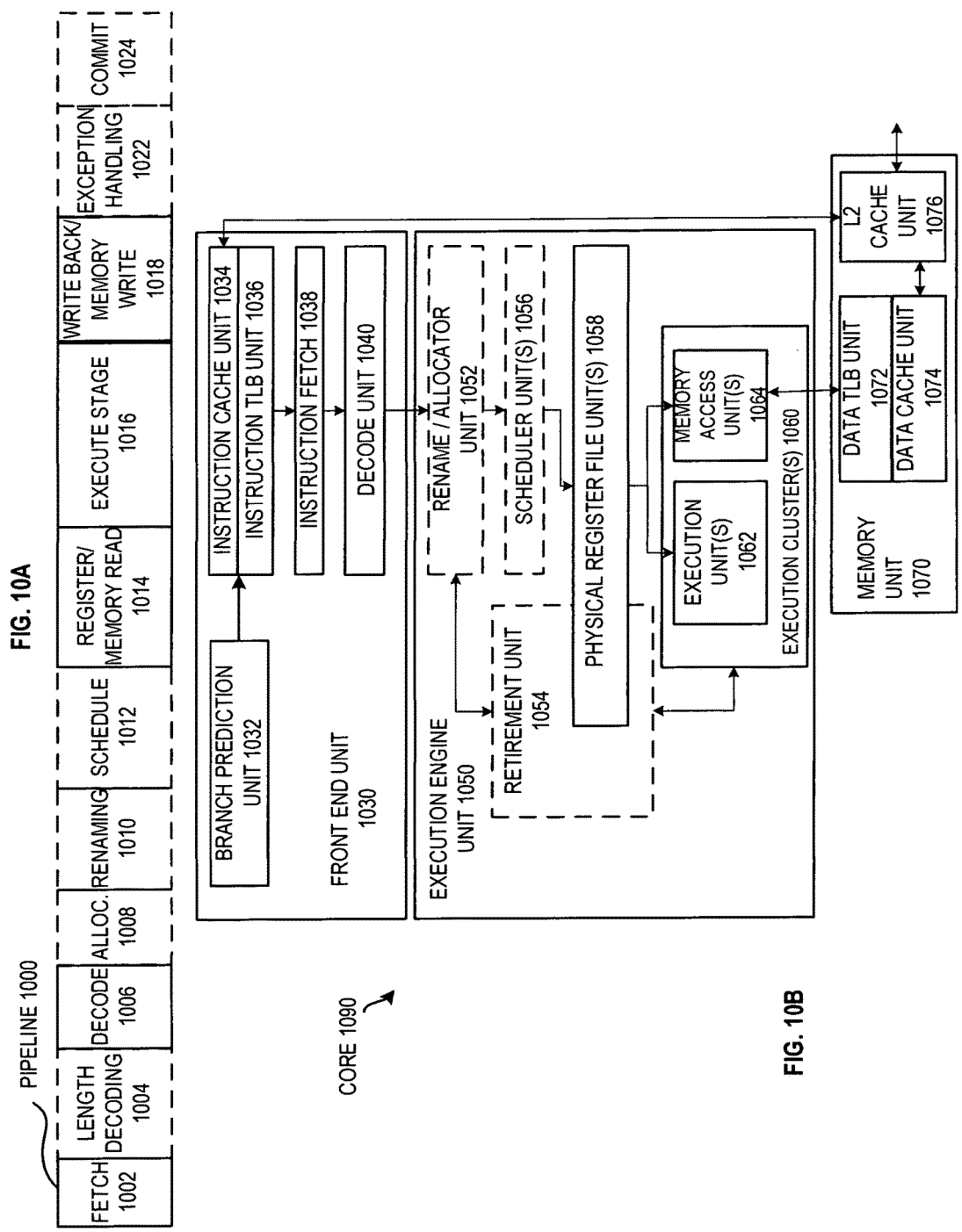

PROCESSORS, METHODS, SYSTEMS, AND INSTRUCTIONS TO SELECTIVELY FENCE ONLY PERSISTENT STORAGE OF GIVEN DATA RELATIVE TO SUBSEQUENT STORES

BACKGROUND

Technical Field

Embodiments described herein generally relate storage of data. In particular, embodiments described herein generally relate to storage of data in persistent memory.

Background Information

Processors are commonly operable to execute instructions to access memory. For example, processors may execute load instructions to load or read data from main memory and/or store instructions to write or otherwise store data to main memory.

Intel® 64 and IA-32 Architectures Software Developer's Manual Combined Volumes: 1, 2A, 2B, 2C, 3A, 3B and 3C, Order Number: 325462-051US, published June 2014, by Intel Corporation of Santa Clara Calif., describes an SFENCE (store fence) instruction to serialize store operations. The SFENCE instruction may perform a serializing operation on all store-to-memory instructions that were issued prior to the SFENCE instruction. This serializing operation may guarantee that every store instruction that precedes the SFENCE instruction in program order becomes globally visible before any store instruction that follows the SFENCE instruction.

BRIEF DESCRIPTION OF THE DRAWINGS

The invention may best be understood by referring to the following description and accompanying drawings that are used to illustrate embodiments. In the drawings:

FIG. 10A is a block diagram illustrating an embodiment of an in-order pipeline and an embodiment of a register renaming out-of-order issue/execution pipeline.

FIG. 10B is a block diagram of an embodiment of processor core including a front end unit coupled to an execution engine unit and both coupled to a memory unit.

DETAILED DESCRIPTION OF EMBODIMENTS

Disclosed herein are persistent store fence instructions, processors to execute the instructions, methods performed by the processors when processing or executing the instructions, and systems incorporating one or more processors to process or execute the instructions. In the following description, numerous specific details are set forth (e.g., specific instruction operations, processor configurations, microarchitectural details, sequences of operations, uses of the instructions, etc.). However, embodiments may be practiced without these specific details. In other instances, well-known circuits, structures and techniques have not been shown in detail to avoid obscuring the understanding of the description.

Figure 1:
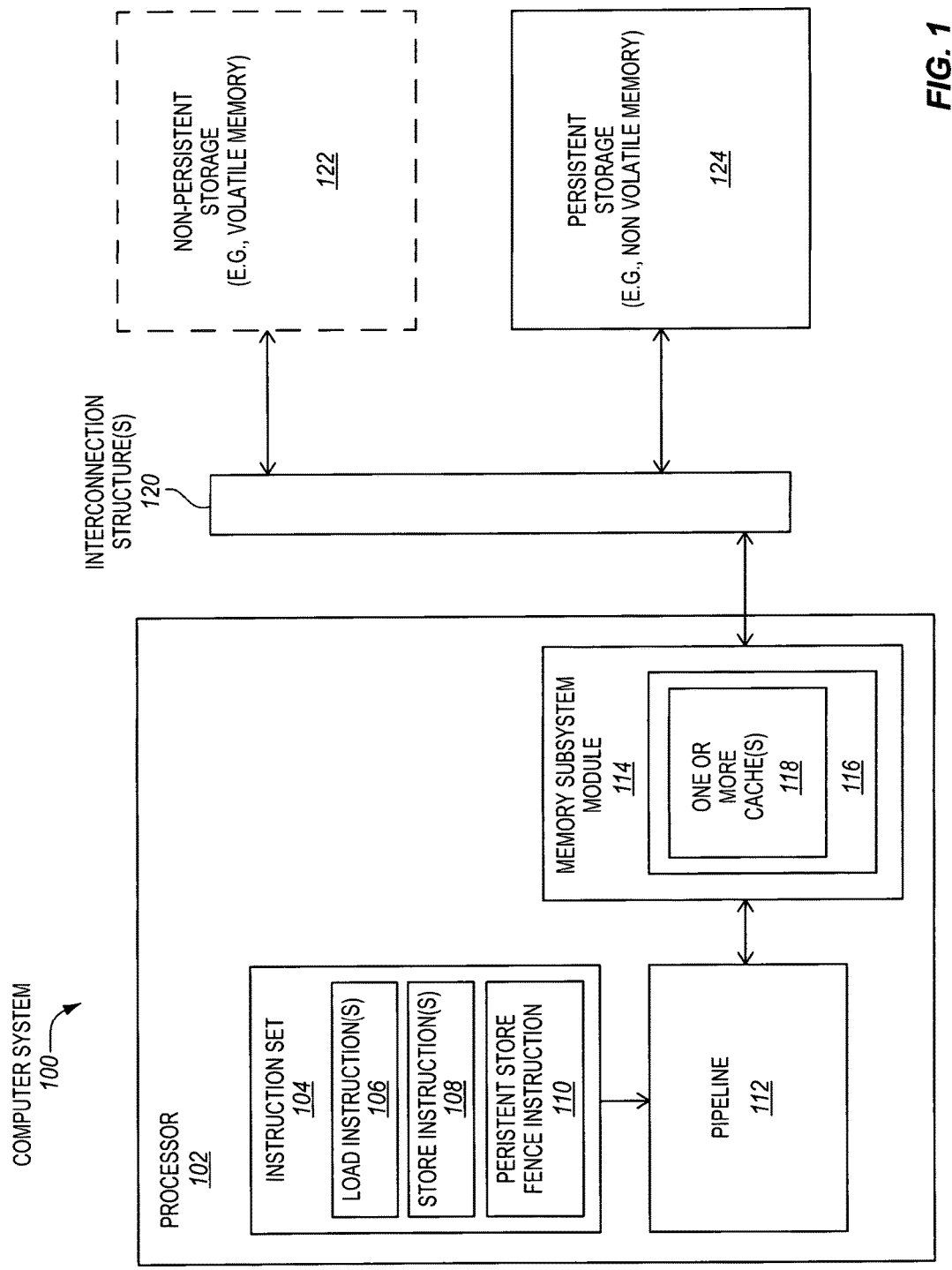
FIG. 1 is a block diagram of an embodiment of a computer system in which embodiments of the invention may be implemented.

FIG. 1 is a block diagram of an embodiment of a computer system 100 in which embodiments of the invention may be implemented. The computer system includes a processor 102, an optional volatile or otherwise non-persistent storage 122, and a non-volatile or otherwise persistent storage 124. The non-persistent storage 122 is optional not required. The processor may be coupled with the non-persistent storage 122 and the persistent storage 124 by one or more interconnection structures 120, such as, for example, one or more buses or other interconnects, one or more hubs or other chipset components, combinations thereof, etc. Various ways of coupling processors with volatile and non-volatile memories known in the arts are suitable.

Volatile memory represents a type of memory or storage that loses its contents when power is not applied. In contrast, non-volatile memory represents a type of memory or storage that is able to retain its contents for long durations even when power is not applied. For example, data may be read from non-volatile memory even after weeks, months, or years without power. Examples of suitable types of non-persistent storage include, but are not limited to, dynamic random access memory (DRAM) and other forms of RAM including types developed in the future. Examples of suitable types of persistent storage include, but are not limited to, hard disks, magnetic tape, other types of magnetic storage devices, flash memory, various types of read-only memory (ROM), optical discs, ferroelectric RAM (F-RAM), and magnetoresistive RAM, and other types developed in the future.

In some embodiments, both the non-persistent storage 122 and the persistent storage 124 may optionally be used together or collectively as a primary storage and may both be accessible to (e.g., addressable by) the processor. In other embodiments, the non-persistent storage 122 may optionally be omitted, and the persistent storage 124 may be used as a primary storage that is accessible to (e.g., addressable by) the processor. In still other embodiments, the non-persistent storage 122 may be deployed as a primary storage (e.g., main memory) and the persistent storage may be deployed as a secondary or backing storage, but the persistent storage may be accessible to (e.g., addressable by) the processor.

The processor 102 has an instruction set 104. The instruction set is part of the instruction set architecture (ISA) of the processor and includes the native instructions that the processor is operable to execute. The instructions of the instruction set represent macroinstructions, assembly language instructions, or machine-level instructions that are provided to the processor for execution as opposed to microinstructions or other instructions that have been decoded from such instructions of the instruction set. As shown, the instruction set may include one or more load instructions 106 to load or read data from the non-persistent and/or persistent storage. The instruction set also includes one or more store instructions 108 to move, write, or otherwise store data in the non-persistent and/or persistent storage.

The processor has a pipeline 112 to process the instructions of the instruction set. By way of example, the pipeline may include an instruction fetch unit to fetch instructions, a decode unit to decode the instructions, one or more execution units to execute the decoded instructions, etc. Various different processor pipeline designs known in the arts are suitable. The scope of the invention is not limited to any known pipeline design. The processor also has a memory sub-system 114 to interface with the non-persistent and/or persistent storage. The memory sub-system may include one or more caches 118 (e.g., one or more levels of cache). For example, certain processors have a combined level 1 (L1) instruction and data cache relatively closer to the pipeline and/or farther from the persistent storage, and a level 2 (L2) data cache relatively farther from the pipeline and/or closer to the persistent storage. Other processors may have a single level of cache, or three or more different levels of cache. Each cache may hold instructions and/or data as desired for the particular implementation.

One reason for the cache(s) 118 is to help reduce the latency of accesses by the processor to data in the non-persistent and/or persistent storage. Accesses to data in the non-persistent and/or persistent storage generally tends to be significantly slower than accesses to data in the cache(s). For example, commonly accesses to data in the cache(s) take no more than a few processor clock cycles, whereas accesses to data in the primary storage may representatively take from tens to hundreds of clock cycles. Consequently, in order to help improve performance, the processor may bring certain data (e.g., data with spatial and/or temporal locality) into the cache(s) from the non-persistent and/or persistent storage so that if that same data is needed again in the near future it can be accessed quickly from the cache(s) instead of more slowly from the non-persistent and/or persistent storage.

In addition, the store instruction(s) 108 may not store data directly and/or immediately from the processor to the non-persistent and/or persistent storage. Rather, the data may initially be cached or stored in the cache(s) 118. Again, this may help to keep the data close to the processor in case it is needed again in the near future and/or may help to avoid a longer latency access to the storage. The memory sub-system of the processor may have a cache coherency mechanism or module 116 to help ensure that the data is coherently stored to the non-persistent and/or persistent storage at appropriate times so that all entities in the system (e.g., another processor) view correct and current versions of the data. By way of example, the cache coherency mechanism or module may help to implement a MESI protocol in which each cache line is in one of the four states modified, exclusive, shared, or invalid.

One advantage to storing data in the persistent storage 124 (e.g., non-volatile memory) is persistency or durability of the data. Persistency or durability generally means that the data stored is not lost in the event of a power loss, operating system failure, system crash, processor failure, or most other types of errors (e.g., in which the computer system needs to be rebooted). Once the data is stored in the persistent storage, it is typically retained even if there is a loss of power, operating system failure, or the like. Moreover, even if the processor fails or the computer system otherwise fails due to a hardware failure, as long as the persistent storage survives, it may generally be possible to recover the data. In contrast, data stored in the non-persistent storage 122 (e.g., in volatile memory) is generally not regarded as being persistent or durable. Similarly, data stored in the cache(s) 118 as well as load/store buffers and/or various other temporary caching and/or buffering structures of the processor (not shown in the illustration for simplicity) is generally also not regarded as being persistent or durable. Such data stored in the non-persistent storage, the cache(s), and the like, may be lost in the event of a loss of power, operating system failure, system crash, processor failure, and certain other types of errors.

In addition, certain applications and/or implementations need data to be stored persistently or durably. For example, in certain database applications and/or data transactions it is very important not to lose data. Also, in some applications and/or implementations it may be useful to store data persistently and/or durably in a particular order (e.g., store one piece of data persistently and/or durably before another piece of data). By way of example, this may be the case in an implementation of write-ahead logging, other serial store algorithms, and the like). In some embodiments, the instruction set 104 of the processor may include an embodiment of a persistent store fence instruction 110 to cause or ensure that an associated store of data is performed to the persistent storage 124 before a subsequent store of data is performed to the persistent storage 124.

Figure 2:
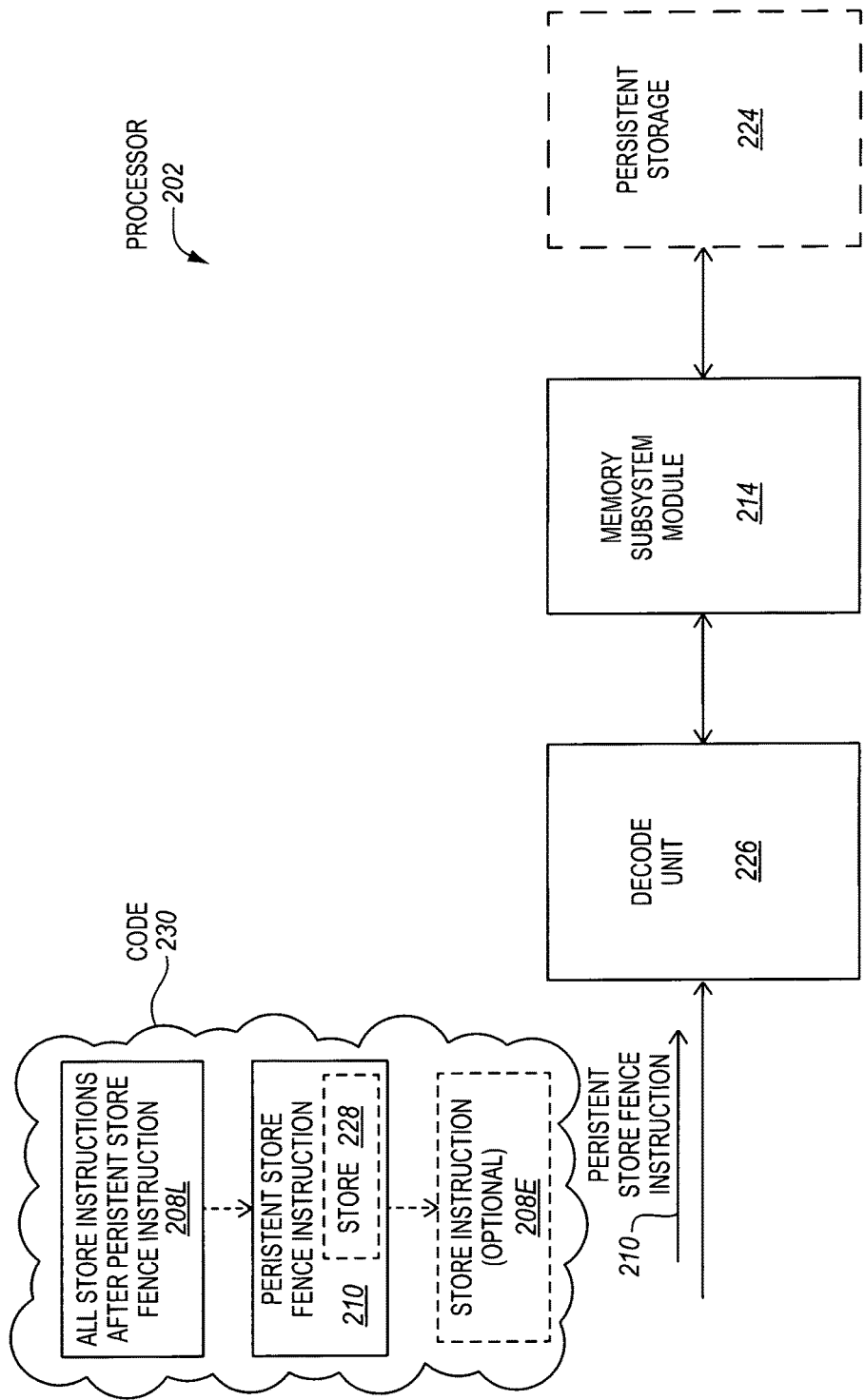
FIG. 2 is a block diagram of an embodiment of a processor that is operable to perform an embodiment of persistent store fence instruction.

FIG. 2 is a block diagram of an embodiment of a processor 202 that is operable to perform an embodiment of persistent store fence instruction 210. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

During operation, the processor 202 may execute, run, or perform code 230 (e.g., a program). For example, the code may be fetched, loaded, or otherwise received into the processor from persistent storage 224 and/or an optional non-persistent memory (not shown). The persistent storage 224 is shown in dashed lines to indicate it is not generally part of the processor. The code may include various different types of instructions. Among those instructions, the code includes the persistent store fence instruction 210. In some embodiments, the persistent store fence instruction may itself optionally be a persistent store instruction to move, write, or otherwise store data to persistent storage 224 (e.g., the instruction 210 may be a persistent store and persistent store fence instruction). Such a persistent store and persistent store fence instruction 210 may have an optional associated persistent store operation 228 to store associated data to the persistent storage 224. In such embodiments, the instruction 210 may explicitly specify (e.g., through one or more fields or a set of bits), or otherwise indicate (e.g., implicitly indicate), a source operand that has data to be stored to the persistent storage. The instruction 210 may explicitly specify (e.g., through one or more fields or a set of bits), or otherwise indicate (e.g., implicitly indicate), an address or other location in the persistent storage 224 where the data is to be stored. Notice that in some embodiments the persistent storage 224 may be addressable by instructions of an instruction set of the processor. Alternatively, in other embodiments, the persistent store fence instruction may not have the associated persistent store operation 228. For example, the persistent store fence instruction may be designed or intended to work with a separate but related persistent store instruction 208E that is operative to store data to the persistent storage 224. For example, the separate persistent store instruction 208E may be designed or implicitly understood to be (e.g., immediately) before (or alternatively (e.g., immediately) after) the persistent store fence instruction 210 in original program or code order. The code may also include a set of one or more persistent store instructions 208L that occur later than and/or after the persistent store fence instruction 210 in program order. The earlier persistent store instruction 208E also occurs earlier than and/or before all of the later persistent store instruction(s) 208L in original program or code order.

Referring again to FIG. 2, the processor includes a decode unit or decoder 226. The decode unit may receive and decode the persistent store fence instruction 210. The persistent store fence instruction may represent a macroinstruction, assembly language instruction, machine code instruction, or other instruction or control signal of an instruction set of the processor. The decode unit may output one or more relatively lower-level instructions or control signals (e.g., one or more microinstructions, micro-operations, microcode entry points, decoded instructions or control signals, etc.), which reflect, represent, and/or are derived from the relatively higher-level persistent store fence instruction. In some embodiments, the decode unit may include one or more input structures (e.g., port(s), interconnect(s), an interface) to receive the instruction, an instruction recognition and decode logic coupled therewith to recognize and decode the instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms used to implement decode units known in the art.

In some embodiments, instead of the persistent store fence instruction being provided directly to the decode unit, an instruction emulator, translator, morpher, interpreter, or other instruction conversion module may optionally be used. Various types of instruction conversion modules are known in the arts and may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the persistent store fence instruction, which may be of a first instruction set, and may emulate, translate, morph, interpret, or otherwise convert the persistent store fence instruction into one or more corresponding intermediate instructions or control signals, which may be of a second different instruction set. The one or more intermediate instructions or control signals of the second instruction set may be provided to a decode unit (e.g., decode unit 226), which may decode them into one or more lower-level instructions or control signals executable by native hardware of the processor (e.g., a memory sub-system module).

Referring again to FIG. 2, a memory sub-system module 214 is coupled with the decode unit 226. The memory sub-system module may receive the one or more decoded or otherwise converted instructions or control signals that represent and/or are derived from the persistent store fence instruction. In embodiments, in which the persistent store fence instruction is a persistent store and persistent store fence instruction, the memory sub-system module may also receive data pertaining to the source operand specified or indicated by the instruction 210 and an indication of the address or location in the persistent storage 224 specified or indicated by the instruction 210 where the data is to be stored. The memory sub-system module is operative in response to and/or as a result of the persistent store fence instruction (e.g., in response to one or more instructions or control signals decoded from the instruction) to cause and/or ensure that data of a given store operation (e.g., store operation 228 or store instruction 208E) corresponding to the persistent store fence instruction is stored persistently and/or durably in the persistent storage 224 before data from all later or subsequent store operations and/or instructions (i.e., those which occur after the given store operation in original program order) is stored persistently and/or durably in the persistent storage. In some embodiments, the persistent store fence instruction may not cause and/or ensure that data of all preceding store operations and/or instructions is stored persistently and/or durably in the persistent storage before data from all later or subsequent store operations and/or instructions, but rather this fencing may be performed selectively for only the given store operation. That is, there is no need to fence all preceding store instructions and/or operations, but rather only the given store instruction and/or operation. This may help to avoid a higher performance cost to fence all the preceding store instructions and/or operations. In some embodiments, the data from these other non-fenced store instructions and/or operations may be stored in the processor cache(s) whereas the data from the given fenced store instruction and/or operation may be non-temporal and may bypass the cache(s) and be stored in a different persistent store fence buffer (e.g., buffer 446).

In some embodiments, the persistent store fence instruction is a persistent store and persistent store fence instruction having the given store operation (e.g., store operation 228). In such embodiments, in some cases the persistent store and persistent store fence instruction may be a non-temporal instruction whose execution is operative to cause the data to be stored to the persistent memory 224 bypassing and without being stored in one or more caches (not shown) of the processor. In other embodiments, the given store operation may correspond to a separate but related instruction (e.g., immediately) before or after the persistent store fence instruction (e.g., store instruction 208E). In some embodiments, the persistent store fence instruction causes the corresponding data of the given store operation to be stored in a new dedicated persistent store fence buffer (e.g., buffer 446 in FIG. 4). In some embodiments, the buffer may optionally be write only and/or may not implement a cache coherency protocol used by one or more cache(s) of the processor (e.g., may not use a MESI protocol implemented by the processor). In some embodiments, as will be described further below, the persistent store fence buffer may implement write combining to allow data corresponding to different persistent store fence instructions to be stored or combined in a same cache line. In some embodiments, as will be described further below, the persistent store fence instruction may be used to store data to a write-ahead log in order to improve the performance of write-ahead logging.

The memory sub-system module and/or the processor may include specific or particular logic (e.g., transistors, integrated circuitry, or other hardware potentially combined with firmware (e.g., instructions stored in non-volatile memory) and/or software) that is operable to perform the persistent store fence instruction and/or store the result in response to and/or as a result of the persistent store fence instruction (e.g., in response to one or more instructions or control signals decoded from the persistent store fence instruction). In one aspect, the memory sub-system module may also be regarded generally as an execution unit to execute the decoded persistent store fence instruction and/or as a unit to perform the decoded persistent store fence instruction. In some embodiments, the memory sub-system module may include the circuitry or logic shown and described for one or more of FIGS. 4-5, which are illustrative examples of a suitable implementations, although the scope of the invention is not so limited.

Advantageously, the persistent store fence operation may be used to cause, ensure, or guarantee that data from a given store operation is stored in the persistent storage before data from all subsequent store operations. Once the data is in the persist storage it is persistent and/or durable. This may offer certain advantages in certain implementations. For example, this may help to increase the efficiency of performing write-ahead logging, as will be discussed further below, although the scope of the invention is not so limited. In other instances, this may be used serialize persistent stores for various other types of algorithms and/or for other reasons.

Compared to the SFENCE instruction discussed in the background section, the SFENCE instruction does not serialize stores to persistent storage and/or does not serialize persistency or durability. Rather, the SFENCE instruction may be used to fence or serialize global visibility of stores to main memory (e.g., DRAM or other volatile memory), but such data may be lost in the event of certain conditions (e.g., a power failure, an operating system failure, a processor failure, a system crash, etc.). As a result, such instructions are not able to serialize the persistency or durability of data storage operations. In addition, the SFENCE instruction fences or serializes all preceding store instructions relative to all following store instructions, whereas in some embodiments, the persistent store fence instruction may only serialize a single given corresponding store instruction and/or operation relative to all following store instructions and/or operations.

To avoid obscuring the description, a relatively simple processor 202 has been shown and described. However, the processor may optionally include other well-known processor components. Possible examples of such components include, but are not limited to, general-purpose registers, a status register (sometimes called a flags register), system control registers, an instruction fetch unit, prefetch buffers, an instruction translation lookaside buffer (TLB), a data TLB, a branch prediction unit, a floating-point execution unit, a SIMD or vector execution unit, out-of-order execution support units (e.g., an instruction scheduling unit, a register rename and/or allocation unit, an instruction dispatch unit, a reorder buffer (ROB), a reservation station, a memory order buffer, a retirement unit, etc.), a bus interface unit, an address generation unit, a debug unit, a performance monitor unit, a power management unit, other components included in processors, and various combinations thereof. Such components may be coupled together in various different suitable combinations and/or configurations known in the arts. Embodiments are not limited to any known such combination or configuration. Moreover, embodiments may be included in processors have multiple cores at least one of which is operative to perform a persistent store fence instruction.

Figure 3:
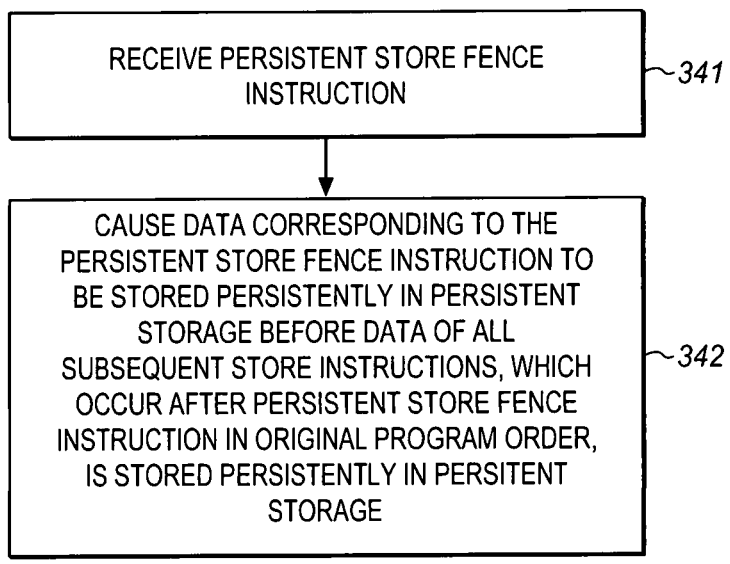
FIG. 3 is a block flow diagram of an embodiment of a method of performing an embodiment of a persistent store fence instruction.

FIG. 3 is a block flow diagram of an embodiment of a method 340 of performing an embodiment of a persistent store fence instruction. In various embodiments, the method may be performed by a processor, instruction processing apparatus, or other digital logic device. In some embodiments, the method 340 may be performed by and/or within the processor 102 of FIG. 1 and/or the processor 202 of FIG. 2. The components, features, and specific optional details described herein for the processors 102, 202, also optionally apply to the method 340. Alternatively, the method 340 may be performed by and/or within a similar or different processor or apparatus. Moreover, the processors 102, 202 may perform methods the same as, similar to, or different than the method 340.

The method includes receiving the persistent store fence instruction, at block 341. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.).

The method includes guaranteeing that, ensuring that, enforcing, or otherwise causing given data corresponding or related to the persistent store fence instruction to be stored persistently in a persistent storage before data from all subsequent store instructions (i.e., which are subsequent to the persistent store instruction in original program order) is stored persistently in the persistent storage, at block 342. In some embodiments, the method may also include storing the given data responsive to the persistent store instruction (e.g., in the case of a persistent store and persistent store fence instruction), although this is not required. In some embodiments, the instruction may cause the given data to be stored non-temporally bypassing processor caches to a persistent store fence buffer (e.g., buffer 446), although the scope of the invention is not so limited.

Figure 4:
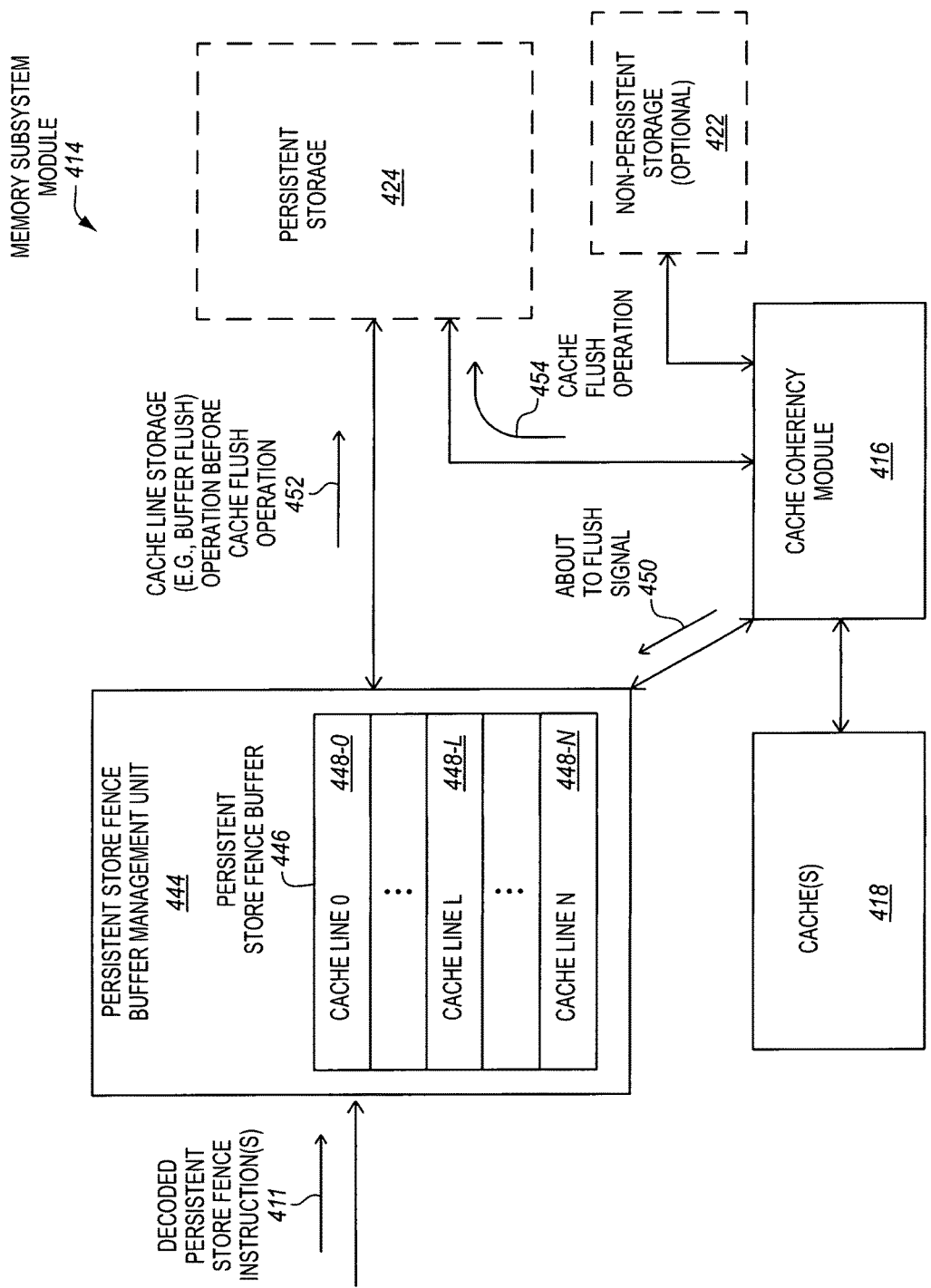
FIG. 4 is a block diagram of an example embodiment of a memory sub-system module having an example embodiment of a persistent store fence buffer.

FIG. 4 is a block diagram of an example embodiment of a memory sub-system module 414 and illustrating an example embodiment of a persistent store fence buffer 446. A persistent storage 424 is coupled with the memory sub-system module. The persistent storage may be similar to or the same as those previously described.

A set of one or more decoded persistent store fence instructions and/or operations 411 may be provided to the memory sub-system module 414. In this example, for simplicity, it is assumed that the persistent store fence instruction that was decoded incorporated a persistent store operation (e.g., store operation 228), although the scope of the invention is not so limited. The memory sub-system module includes the persistent store fence buffer 446 and a corresponding persistent store fence buffer management unit 444. The buffer management unit is operative to manage the persistent store fence buffer, for example, to manage storage of data in, and flushing or other removal of data from, the buffer. The management unit may be implemented in hardware (e.g., integrated circuitry, transistors or other circuit elements, etc.), firmware (e.g., ROM, EPROM, flash memory, or other persistent or non-volatile memory and microcode, microinstructions, or other lower-level instructions stored therein), software (e.g., higher-level instructions stored in memory), or a combination thereof (e.g., hardware potentially combined with one or more of firmware and/or software).

The persistent store fence buffer 446 is operative to temporarily buffer or store data associated with the persistent store fence instruction (e.g., data from store operation 228 or store instruction 208E). The scope of the invention is not limited to any particular type of memory for the persistent store fence buffer. Various types of volatile memory are suitable, such as, for example, static random access memory (SRAM), types of memory used to implement processor caches, and the like. Virtually any type of memory or data storage device that can be fabricated on a die with a processor is potentially suitable. In some embodiments, the persistent store fence buffer may optionally be organized similarly to a processor cache and may have a plurality of cache lines 448. As shown, the persistent store fence buffer may have a cache line 0 448-0, a cache line L 448-L, through a cache line N 448-N, where N may represent any desired number suitable for the particular implementation. In some embodiments, there may be on the order of from about four to about several hundred cache lines, or from about eight to about one hundred twenty eight cache lines, although the scope of the invention is not so limited.

In some embodiments, in contrast to processor cache(s), the persistent store fence buffer may optionally be write only but not ordinarily readable. For example, the processor (e.g., a core) may not ordinarily be able to perform a regular user-level load from memory instruction to load or read data from the persistent store fence buffer. It is to be appreciated that the processor, under certain limited circumstances, may be able to read the contents of the persistent store fence buffer, for example, during debugging or testing (e.g., during a built-in self test (BIST)). In some embodiments, cache coherency may not be maintained in the persistent store fence buffer other than those operations related to maintaining cache coherency in cache(s) 418 that may be used to implement the persistent store fence. For example, the cache(s) may implement a MESI protocol (e.g., the cache lines of the caches may each have two MESI bits) but the persistent store fence buffer may not (e.g., the cache lines of the buffer may not have the two MESI bits).

The cache coherency module 416 is coupled with the persistent store fence buffer management unit 444. In some embodiments, when the cache coherency module determines to evict, flush, or otherwise remove a cache line from one or more caches 418 of the processor, the cache coherency module may provide an indication, notification, or other signal 450 (e.g., an intent to flush cache line signal) to the persistent store fence buffer management unit, before actually flushing or removing the cache line from the cache(s). The signal 450 may indicate, notify, communicate, or otherwise signal to the management unit that a cache line is about to be flushed or otherwise removed from the cache(s), and may help to allow the management unit to flush or otherwise remove or store one or more cache line(s) from the buffer to the persistent memory before the cache line from the cache(s) are flushed and become persistent. In some embodiments, in order to maintain the persistent store fence, the persistent store fence buffer management unit may perform a buffer flush, eviction, or other removal operation 452 to flush, evict, or otherwise remove or store a cache line (e.g., cache line L 448-L) from the persistent store fence buffer to the persistent storage. In some embodiments, the processor and/or the memory sub-system module may guarantee and/or ensure and/or cause this to occur, responsive to the associated persistent store fence instruction, before a cache flush or other cache line removal operation 454 associated with the signal 450 is performed to flush the cache line from the cache(s) 418 to the persistent storage. The buffer may flush to persistent memory transparently in the background based on signals from the cache coherency module that cache lines are going to be evicted or flushed. In some embodiments, the entire persistent store fence buffer may optionally be flushed to the persistent storage when any cache line is flushed from the cache(s) to the persistent storage. This may help to provide a relatively simpler implementation. In other embodiments, additional information may optionally be stored in the persistent store fence buffer to allow individual cache lines in the buffer to be selectively flushed to the persistent storage based on individual corresponding cache lines being flushed from the cache(s).

In some embodiments, the data in the persistent store fence buffer may not need to be flushed or removed to the persistent storage until right before a cache line is about to be flushed or removed from the cache(s) to the persistent storage and/or a subsequent store operation is about to become persistently stored in the persistent storage. Generally avoiding flushing the buffer except when needed helps to avoid relatively long latency memory accesses. Advantageously, the persistent store fence buffer may help to avoid needing to wait for the data corresponding to the persistent store fence instruction to be stored to the persistent storage and become persistent. If such data was stored directly to the persistent storage, a generally much longer latency operation would generally be needed (e.g., storing data to the persistent memory often takes on the order of tens to hundreds of clock cycles). In some embodiments, the data may be stored in the persistent store fence buffer in no more than several clock cycles (e.g., no more than about five clock cycles).

In some embodiments, there may optionally be no persistent order requirement between different persistent store fence instructions. In some embodiments, this may optionally help to allow an even more efficient implementation of the persistent store fence instructions by allowing data corresponding to multiple different persistent store fence instructions to be stored in the same cache line in a persistent store fence buffer.

Figure 5:
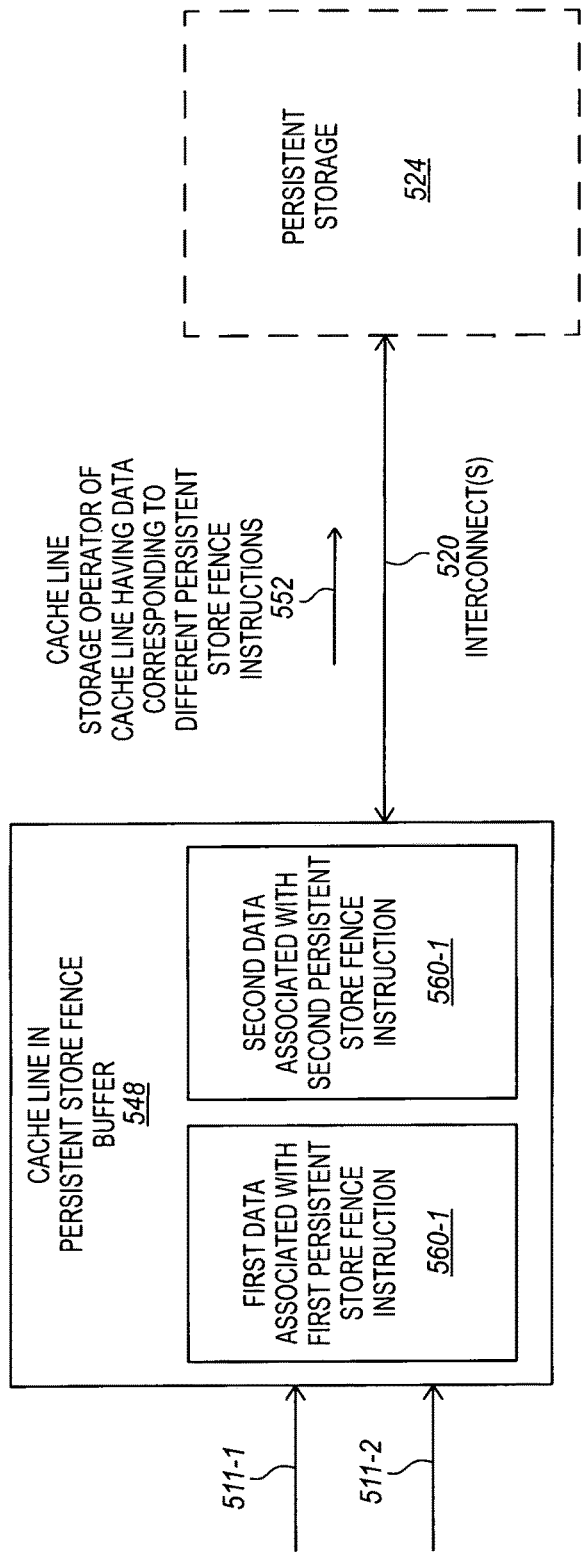
FIG. 5 is a block diagram of an example embodiment of a cache line for a persistent store fence buffer that has data corresponding to different persistent store fence instructions.

FIG. 5 is a block diagram of an example embodiment of a cache line 548 for a persistent store fence buffer that has data 560-1, 560-2 corresponding to different persistent store fence instructions 511-1, 511-2, and an example embodiment of a cache line storage operation 552 of the cache line to persistent memory 524 in the same signal or cycle on one or more interconnects 520. A first persistent store fence instruction 511-1 may have a first associated or corresponding data 560-1 that may be stored in the cache line. Likewise, a second persistent store fence instruction 511-2 may have a second associated or corresponding data 560-2 that may be stored in the same cache line and at the same time as the data 560-1. In some embodiments, this may be performed through a write-combining operation in the persistent store fence buffer. That is, the persistent store fence buffer may represent a write-combining buffer.

Later, at an appropriate time (e.g., based on an intent to flush a cache line signal received from a cache coherency module), the cache line 548 may be flushed, evicted, or otherwise removed or stored to the persistent storage 524 through a cache line storage operation 552. The cache line storage operation may store the cache line having the first data 560-1 and the second data 560-2 corresponding to the different persistent store fence instructions 511-1, 511-2. In some embodiments, the cache line storage operation may be performed in a single and/or a common set of one or more cycles or signals on the one or more interconnects 520 (e.g., both the data 560-1 and 560-2 may go on a same set of one or more bus cycle(s)). That is, data corresponding to multiple different persistent store fence instructions may be written or otherwise stored to the persistent memory in the same bus or interconnect cycle. For simplicity, data from only two different persistent store fence instructions is described in this example, but in some cases data from three or more different persistent store fence instructions may potentially be combined in the same cache line. Advantageously, such ability to combine data corresponding to different persistent store fence instructions in the same cache line and perform a single cache line write to the persistent memory may help to avoid or eliminate one or more relatively long latency stores to the persistent memory. In addition, this may also help to reduce the amount of bandwidth on the one or more interconnects leading to the persistent memory.

The processor and/or the memory sub-system unit may perform in-order stores of the data to the persistent store fence buffer and when the data is subsequently flushed or removed from the persistent store fence buffer all the data in the same cache line may be atomically written to the persistent storage. By in-order it is meant that the data may be stored in the persistent store fence buffer in the same order as the original program order of the corresponding persistent store fence instructions. In some embodiments, different cache lines may be flushed or removed from the persistent store fence buffer out-of-order to fully exploit the memory parallelism in the underlining persistent memory system. By out-of-order it is meant that the data may be flushed or removed from the persistent store fence buffer in a different order than the original program order of the corresponding persistent store fence instructions.

Figure 6:
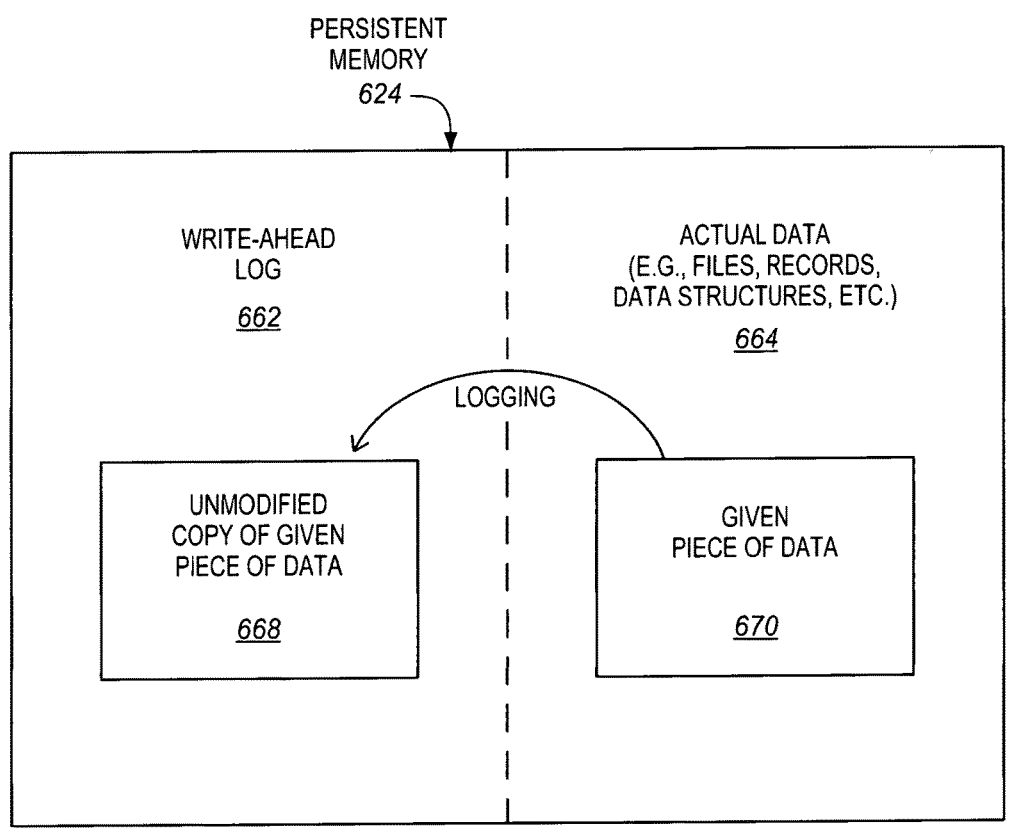
FIG. 6 is a block diagram of an embodiment of a persistent memory having data and a write-ahead log.

In some embodiments, the instructions and processors disclosed herein may be used to improve the efficiency of write-ahead logging. Write-ahead logging is a known technique to achieve atomicity and durability/persistency when modifying data. FIG. 6 is a block diagram of an embodiment of a persistent memory 624 having data 664 and a write-ahead log 662. The persistent memory may represent any of the previously described types of persistent memory. The data may represent various different types of data used in computer systems, databases, or the like. Examples of suitable data include, but are not limited to, files, records, data structures, tables, database records, images, videos, and the like. The write-ahead log is generally located in a different region of the persistent memory than the data. In the illustration, a dashed line is used to indicate that the write ahead log may optionally be located or stored on a different persistent storage device (e.g., a different disk) than the data. This may further help to ensure data durability/persistency (e.g., in the event of a disk failure), but is not required.

In write-ahead logging, the data and/or modifications to the data may be written to the write-ahead log before the modifications to the data are actually stored over the data in the persistent memory. For example, before a given piece of data 670 is changed or modified, an unmodified copy of the given piece of data 668 may be stored in the write-ahead log 662. In this way, even if a loss of power or other event occurs that could cause the given piece of data to be lost from a non-persistent (e.g., volatile) memory (e.g., a processor cache) while the given piece of data is being modified within a processor, the copy of the given piece of data may be recovered from the write-ahead log after the event has occurred. Advantageously, this may help to prevent the given piece of data from being lost while being modified even in the face of power failures or various other potentially disastrous errors. To further illustrate, if a program is in the middle of performing an operation that modifies a set of data when a computer system experiences power loss or a disastrous error, upon restart and reboot, the program generally needs to know whether the operation fully completed, partially completed, or failed entirely. If write-ahead logging were used, the program could examine the write-ahead log to determine what portions of the operation had actually been completed before the error occurred. The program may use this information to decide how to proceed and/or how to continue or restart the operation. For example, the program may reattempt the operation starting with the first uncompleted modification as determined from the write-ahead log.

Write ahead logging is often implemented as a transaction in which multiple different pieces of data are modified within the same transaction. Only after all of the different pieces of data have been successfully logged, and modified, and the modified pieces of data have been stored in the persistent memory is the transaction successfully completed. Generally, only when the transaction is entirely successfully completed is the transaction "committed." Committing the transaction basically declares that the entire transaction has completed successfully and/or indicates that all of the attempted modifications have completed successfully and have been stored in the persistent memory. At this point, the data stored or preserved in the write-ahead log are no longer needed, since even if a disastrous event occurs, all of the modified data is already stored in the persistent memory. The write-ahead logging provides persistency and/or durability to the given set of data throughout the change or modification, since a copy of the given set of data is stored in the persistent memory before any change is made to the given set of data. In addition, the write-ahead logging provides atomicity, since a given set of data is either entirely updated or not updated during the transaction by either committing or not committing the entire transaction.

In write-ahead logging, two persistency orders should generally be maintained. Firstly, a log persistency order should generally be maintained. According to the log persistency order, the original data that are to be modified should be persistently stored in the write-ahead log in persistent storage before the corresponding modified data are stored in the persistent storage. Otherwise, if the modified data are stored in the persistent storage over the original data, and the original data to be modified is in the cache(s) and not yet stored to the write-ahead log in the persistent storage, then if a disastrous event (e.g., a power failure) occurs, the original data to be modified is not preserved and may be lost thereby preventing recovery in the event of an unsuccessful completion of the transaction. A second persistency order that should generally be maintained is a commit persistency order. According to the commit persistency order all modified data in the transaction should be persistently stored to the persistent storage before the commit indication is persistently stored to the write-ahead log in the persistent storage. Otherwise, if the commit indication is persistently stored to the write-ahead log in the persistent storage while some modified data is stored in the cache(s) this modified data may be lost during a disastrous event even though the commit indication in the write-ahead log would indicate the transaction completed successfully. One challenge is that caching of data in one or more processor caches may violate one or more of these two persistency orders if the proper precautions are not taken. The caches are generally implemented in volatile or otherwise non-persistent storage and are susceptible to disastrous events.

Figure 7:
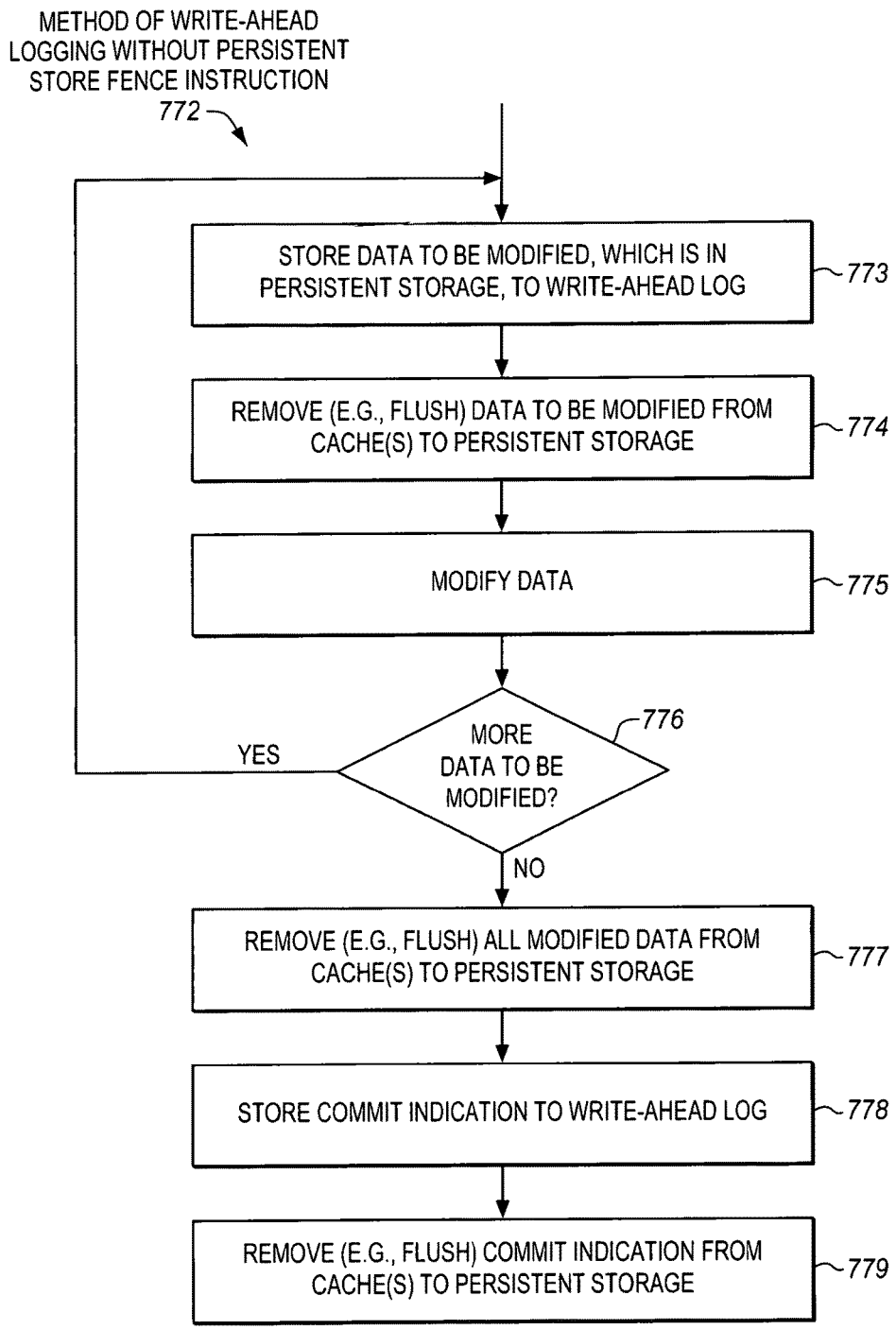
FIG. 7 is a block flow diagram of one possible method of write-ahead logging performed without a persistent store fence instruction as disclosed herein.

FIG. 7 is a block flow diagram of one possible method 772 of write-ahead logging performed without the persistent store fence instructions disclosed herein. Data in a persistent storage which is to be modified or changed is stored to a write-ahead log in the persistent storage, at block 773. Due to one or more caches being present in a processor the data that is to be modified may not actually be stored directly in the write-ahead log but rather may be cached in these one or more caches. These processor caches represent non-persistent storage and may lose their contents when certain events occur (e.g., a loss of power, etc.).

The data to be modified is removed (e.g., flushed) from the one or more caches to the persistent storage, at block 774. For example, this may be performed with a cache line flush type of instruction. This is generally needed in order to satisfy the log persistency order. One drawback with this approach is that it generally takes a lot of time and/or has a high latency due to the time needed to write or store to the persistent memory (e.g., on the order of tens to hundreds of clock cycles.

Then, the data that is to be modified may actually be modified at block 775. Notice that the modification of the data at block 775 takes place after the data to be modified has been removed from the one or more caches to the persistent storage at block 774 thereby ensuring that a copy of the data to be modified is persistently stored in the persistent storage instead of in the non-persistent processor caches. This helps to ensure data persistency/durability, as previously described.

At block 776, a determination is made whether or not there is more data to be modified. If there is more data to be modified (i.e., "yes" is the determination at block 776), the method may revisit blocks 773-775. Conversely, if there is no more data to be modified in this transaction (i.e., "no" is the determination at block 776), the method may advance to block 777. Notice that for each piece of data modified, between the time the data to be modified is stored to the write-ahead log at block 773, and the time the data is actually modified at block 775, the data to be modified needs to be flushed from the cache(s) to the persistent storage (i.e., actually stored in the write-ahead log in the persistent storage instead of in the caches) at block 775. A drawback with all of these flushes is that they take a lot of time to perform.

At block 777, all modified data is removed (e.g., flushed) from the cache(s) to the persistent storage. This is performed because the modification of the data at block 775 may not actually store the modified data in the persistent storage but rather in the cache(s). This generally needs to be done before the commit indication is stored in the write-ahead log in the persistent storage in order to satisfy the commit persistency order.

Then, a commit indication may be stored to the write-ahead log, at block 778. The commit indication may indicate that the transaction has completed successfully, as previously described. At block 779, the commit indication may be removed (e.g., flushed) from the cache(s) to the persistent storage.

If a disastrous event had occurred before the commit indication was stored in the write-ahead log, all the partial data updates of the transaction may be recovered back to their original data using the original data in the write-ahead log. Conversely, if a disastrous event occurs after commit indication is stored in the write-ahead log, there is no need to for a recovery, since all the data updates have completed successfully.

As previously described, the removal (e.g., flushing) of the data to be modified from the cache(s) at block 774 before each data update at block 775 tends to take an excessive amount of time. In some embodiments, since the updated data typically stays in the caches, there may be no need to remove (e.g., flush) the data to be modified from the cache(s) to the persistent storage until the modified data are actually stored back from the cache(s) to the persistent storage, which in many implementations is relatively infrequent (e.g., due to data locality in the program). In such implementations, significantly more efficient write-ahead logging may be achieved by omitting such removal (e.g., flushing) of the data at block 774. Unfortunately, the write-back of the modified data from the cache(s) to the persistent storage is generally performed by hardware (e.g., by a cache coherency module) and is therefore not under the control of software in many implementations. It is noted that some suitable implementations may alternatively perform software controlled cache coherency.

Figure 8:
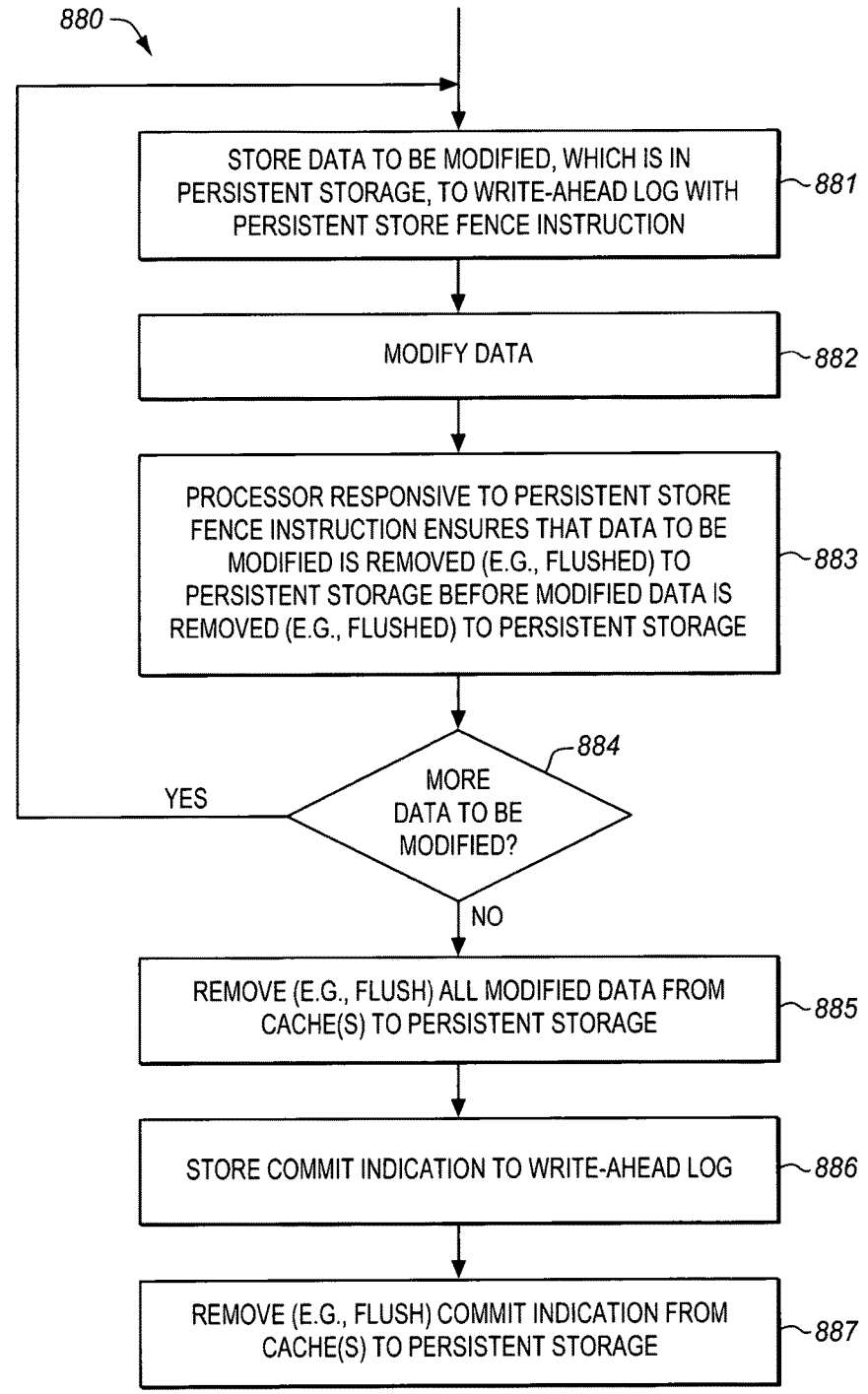
FIG. 8 is a block flow diagram of an example embodiment of a method of write-ahead logging performed with an embodiment of a persistent store fence instruction.

FIG. 8 is a block flow diagram of an example embodiment of a method 880 of write-ahead logging performed with an embodiment of a persistent store fence instruction. In some embodiments, data in a persistent storage which is to be modified or changed may be stored to a write-ahead log in the persistent storage with (or in conjunction with) an embodiment of a persistent store fence instruction, at block 881. Either the persistent store fence instruction itself may store the data, or a corresponding separate store instruction may store the data, as previously described. In some embodiments, the data may initially and/or temporarily be stored in a persistent store fence buffer (e.g., buffer 446). In some embodiments, the persistent store fence instruction may be a non-temporal instruction and the data may bypass the processor cache(s). This may help to avoid the data taking up space in and/or polluting the cache(s).

Then, the data that is to be modified may actually be modified at block 882. This modified data may be initially and/or temporarily cached in the processor cache(s).

Significantly, at bock 883, the processor responsive to the persistent store fence instruction may ensure, guarantee, or enforce that the data to be modified is removed (e.g., flushed, evicted, etc.) and persistently stored to persistent storage before the modified data is removed (e.g., flushed, evicted, etc.) from the cache(s) and persistently stored to the persistent storage. Advantageously, there is no need to flush or otherwise remove the data to be modified from cache(s) to the persistent storage, as was performed at block 774 in FIG. 7. Significantly, this may help to avoid a relatively high latency memory access operation (e.g., from tens to hundreds of clock cycles) for each piece of data modified. The persistent fence instruction may ensure that the log persistency order is still maintained. It is worth noting that in many cases the data to be modified may not actually be persistently stored to the persistent storage except if or until just before the modified data is persistently stored to the persistent storage. If the modified data is not stored to the persistent storage, the instruction does not guarantee that the data to be modified is stored in the persistent storage.

At block 884, a determination is made whether or not there is more data to be modified. If there is more data to be modified (i.e., "yes" is the determination at block 884), the method may revisit blocks 881-883. Conversely, if there is no more data to be modified in this transaction (i.e., "no" is the determination at block 884), the method may advance to block 885.

At block 885, all modified data is removed (e.g., flushed) from the cache(s) to the persistent storage. This is performed because the modification of the data at block 882 may not actually store the modified data in the persistent storage but rather in the cache(s). Then, a commit indication may be stored to the write-ahead log, at block 886. At block 887, the commit indication may be removed (e.g., flushed) from the cache(s) to the persistent storage.

Advantageously, the use of the persistent store fence instruction may help to avoid relatively high latency memory access operations for each piece of data modified. In some embodiments, if all of the modified data is able to fit or be stored in the cache(s), the algorithm may only flush or remove the data from the persistent store fence buffer to the persistent storage once before flushing all the modified data from the cache(s) to the persistent storage at the commit time. Further, in some embodiments, if the persistent store fence buffer is able to write combine data corresponding to different persistent store fence instructions in the same cache line, this may further help to avoid some long latency data writes to the persistent storage.

In some embodiments, the software may implement write-ahead logs carrying sequence numbers in cache line unit. In case of system crash during the flush or removal of cache lines from the persistent store fence buffer, only consecutive logs with correct sequence numbers may be used to recover the data. For example, sequence numbers 1, 2, 3, and 5 may be present, but sequence number 4 may be missing. When doing recovery, the sequence numbers have information about which are needed to recover and which are not.

Although the description above has emphasized write-ahead logging, it is to be appreciated that the scope of the invention is not so limited. The persistent store fence instructions described herein are general-purpose instructions and may be used for various different purposes. In addition, similar or related techniques to write-ahead logging may also benefit from the persistent store fence instructions described herein. For example, other techniques that store a copy of data to a different persistent memory location before data is modified, other techniques that provide atomicity and durability of data during updates, and the like, may potentially benefit. Examples of other techniques that may also benefit include, but are not limited to, shadow paging, journaling in file system updates, and the like.

Figure 9:
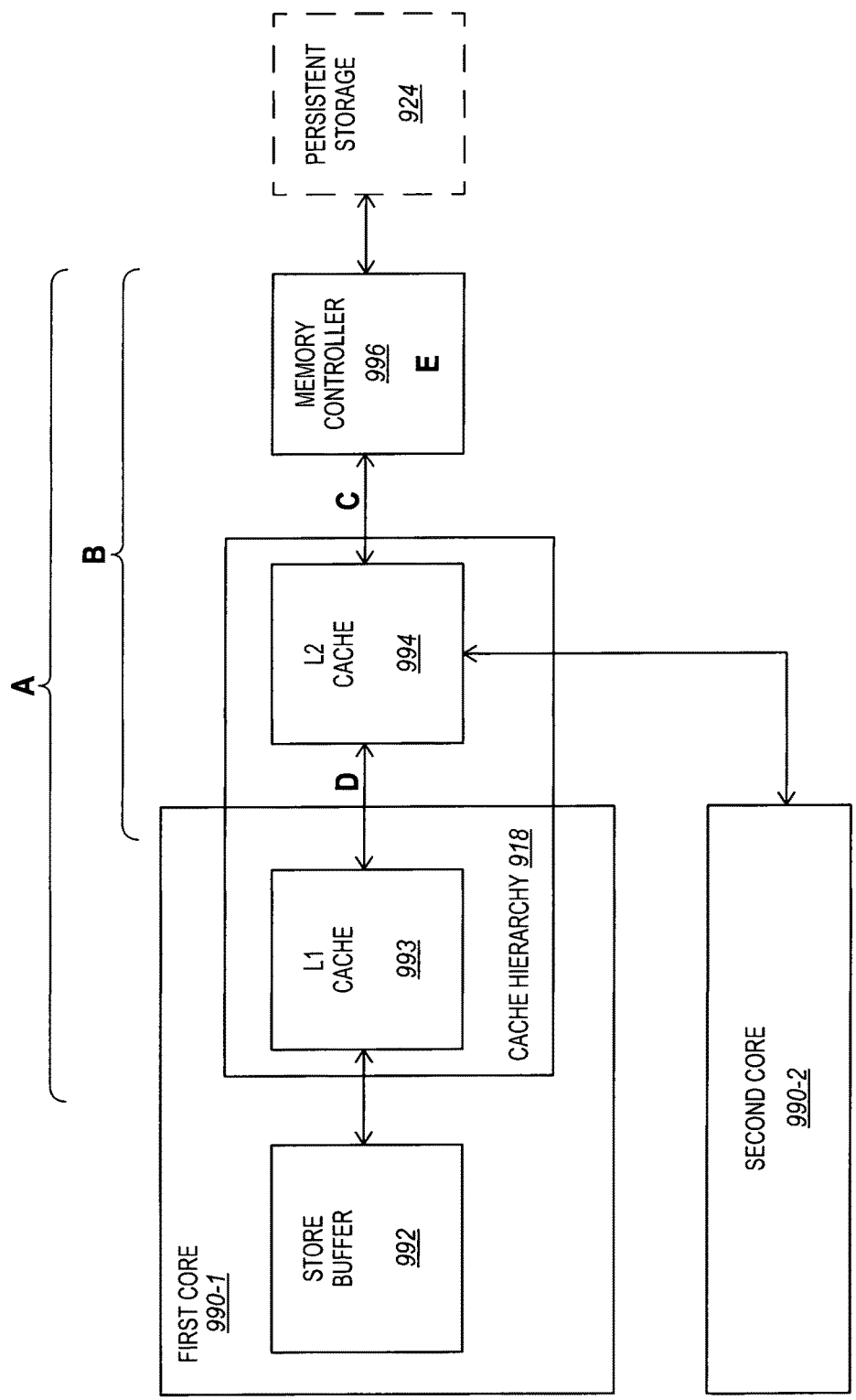
FIG. 9 is a block diagram illustrating various suitable locations for an embodiment of a persistent store fence buffer.

FIG. 9 is a block diagram illustrating various examples of suitable locations for an embodiment of a persistent store fence buffer. Computer systems typically have multiple different types of components that a store of data goes through on its way to persistent storage. In the illustrated example, these components include a store buffer 992, one or more levels of cache or a cache hierarchy 918 (e.g., including an L1 cache 993 and an L2 cache 994), a memory controller 996, and finally the persistent storage 924. A store may potentially be cached or buffered at any of these or other components or hardware structures between the processor pipeline and the persistent storage.

A persistent store fence buffer may be variously located among these components or hardware structures and/or at various different distances between the processor pipeline and the persistent storage. Depending on the particular location, data flushed or removed from that hardware structure may induce a flush or removal of data from the persistent store fence buffer. Generally, the closer the persistent store fence buffer is to the processor pipeline, the lower persistent store fence instruction latency the data needs to be stored to the persistent store fence buffer before a subsequent non-persistent store fence instruction in program order is able to store the data to the cache. On the other hand, the closer the persistent store fence buffer to the processor pipeline, the more frequent persistent store fence buffer flush operations will be (e.g., since there is less caching before the buffer), and the higher the latency of such persistent store fence buffer flush operations (e.g., since there is a longer path from the persistent store fence buffer to the persistent storage).

In some embodiments, as shown at reference A, the persistent store fence buffer may be located or disposed at various places between an output of the store buffer 992 and an input to the persistent storage 924. In some embodiments, as shown at reference B, the persistent store fence buffer may optionally be located or disposed at various places between an output of a first level cache closest to the processor pipeline (e.g., the L1 cache 993) and an output of a memory controller 996. In some embodiments, as shown at reference C, the persistent store fence buffer may optionally be located or disposed between an output of a last level cache (e.g., an L2 cache 994 or alternatively an L3 cache) and an input of the memory controller. In some embodiments, as shown at reference D, the persistent store fence buffer may optionally be located or disposed between two different levels of cache (e.g., between the L1 cache and the L2 cache). In one aspect, the L1 cache may be dedicated to a first core 990-1, whereas the L2 cache may be shared by the first core and a second core 990-2. In some embodiments, as shown at reference E, the persistent store fence buffer may optionally be located or disposed within the memory controller. The scope of the invention is not limited to any known location of the persistent store fence buffer. The desired location of the persistent store fence buffer may be determined without undue experimentation by a person skilled in the art and having the benefit of the present disclosure to satisfy the needs of the particular implementation based on the relative tradeoffs of persistent store fence instruction latency, persistent store fence buffer flush overhead, or other considerations.

On multi-core systems, another design choice is to place the persistent store fence buffer in a shared component or hardware structure or per-core private or dedicated component or hardware structure. The private/dedicated hardware structures are closer to the process pipeline and the shared hardware structures are closer to persistent storage. Placing the persistent store fence buffer at shared hardware structure may tend to introduce more persistent store fence buffer flushes due to the data update change from a different software thread. On the other hand, placing the persistent store fence buffer at a private hardware structure may tend to involve flushing the persistent store fence buffer at operating system context switches of a software thread to a different core. That may involve hardware to flush the persistent store fence buffer on all hardware interrupts and/or exceptions that may lead to an operating system context switch. In some embodiments, the persistent store fence buffer may optionally be partitioned into a plurality of slices based on cache line address hashing. This may allow the persistent store fence buffer to be flushed in all cache slices in case of eviction of cache data in any cache slice.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-Of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file unit(s) 1058. Each of the physical register file unit(s) 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file unit(s) 1058 comprises a vector registers unit, a write mask registers unit, and a scalar registers unit. These register units may provide architectural vector registers, vector mask registers, and general purpose registers. The physical register file unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file unit(s) 1058 and the memory unit 1070 perform the register read/memory read stage 1014; the execution cluster 1060 perform the execute stage 1016; 6) the memory unit 1070 and the physical register file unit(s) 1058 perform the write back/memory write stage 1018; 7) various units may be involved in the exception handling stage 1022; and 8) the retirement unit 1054 and the physical register file unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11B:
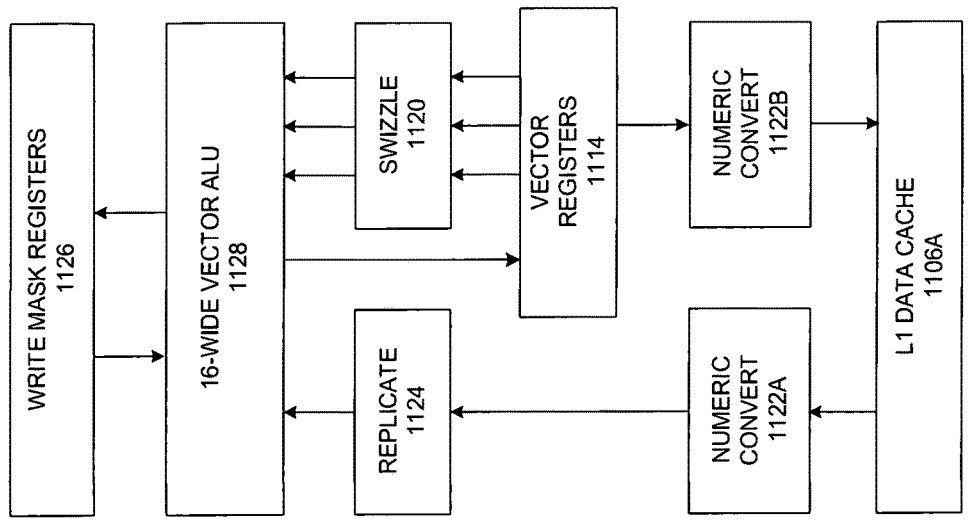
FIG. 11B is a block diagram of an embodiment of an expanded view of part of the processor core of FIG. 11A.
Figure 11A:
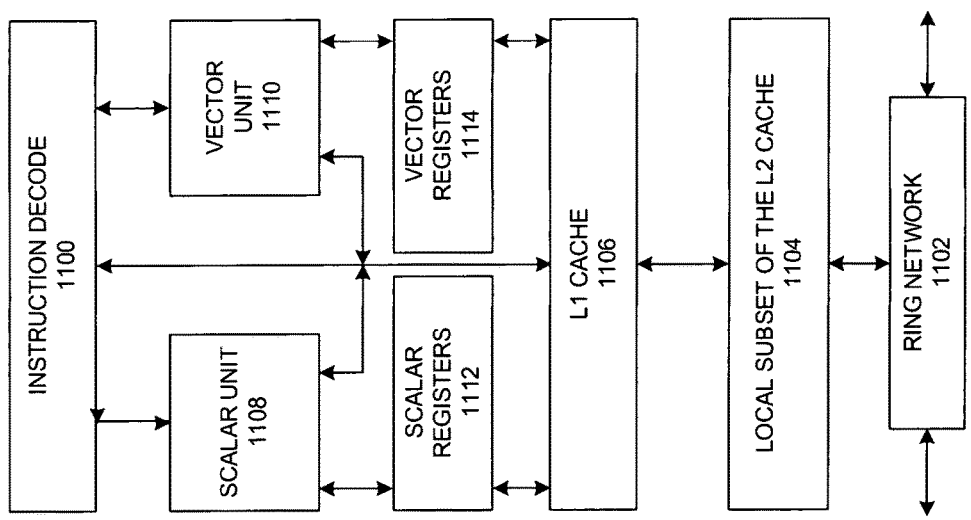
FIG. 11A is a block diagram of an embodiment of a single processor core, along with its connection to the on-die interconnect network, and with its local subset of the Level 2 (L2) cache.

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
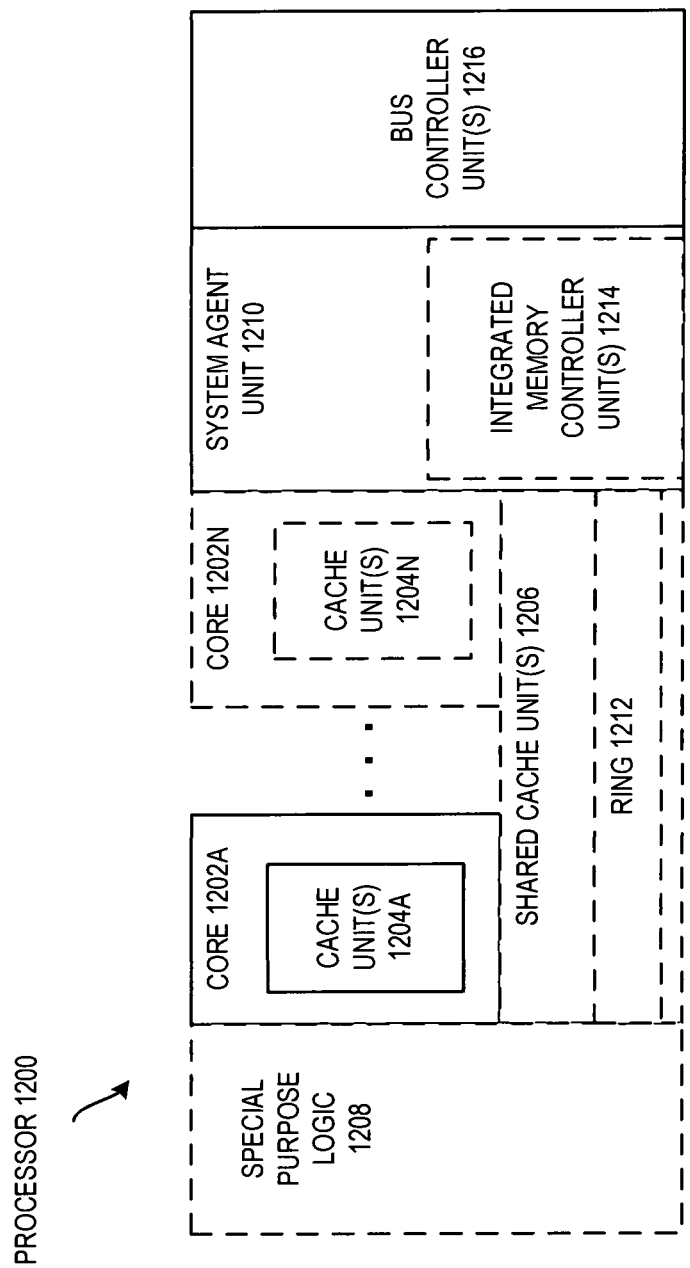
FIG. 12 is a block diagram of an embodiment of a processor that may have more than one core, may have an integrated memory controller, and may have integrated graphics.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 202A, cache unit(s) 1204A, a system agent 1210, and a set of one or more bus controller units 1216, while the optional addition of the dashed lined boxes illustrates an alternative processor 1200 with multiple cores 202A-N, multiple cache units 1204A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multithreading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
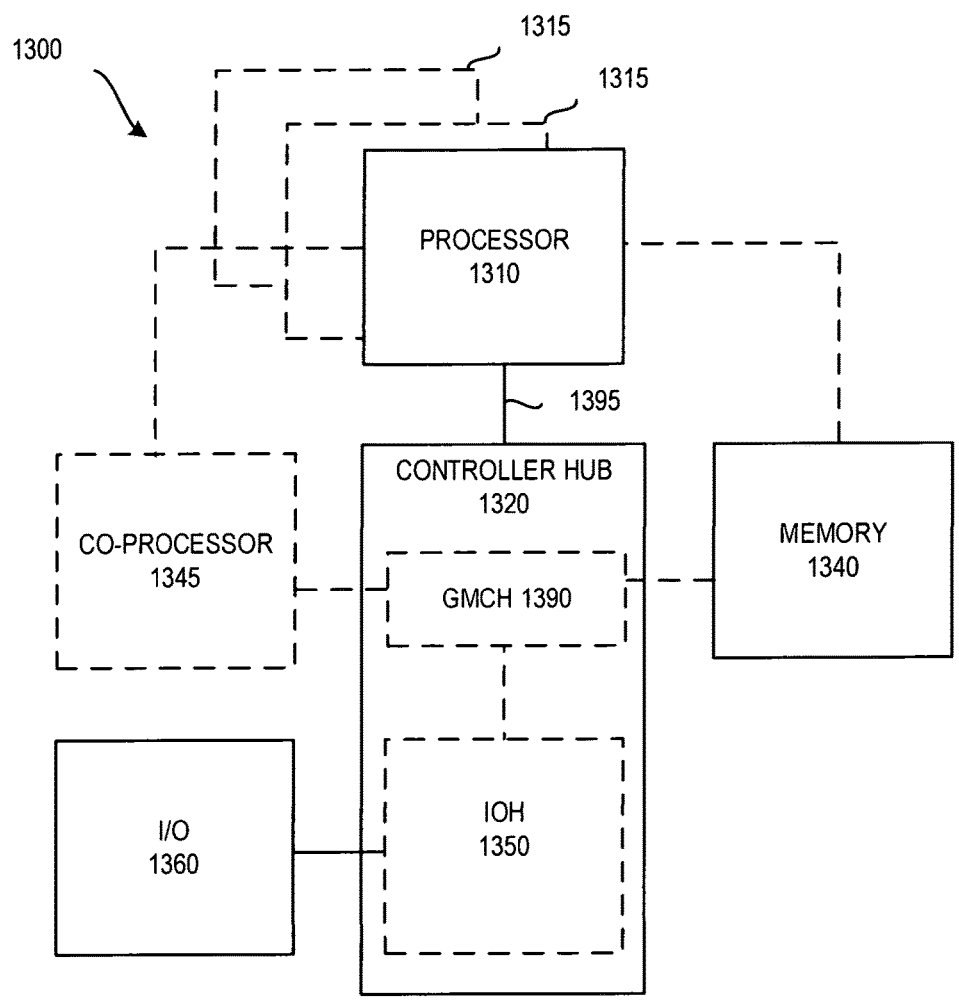
FIG. 13 is a block diagram of a first embodiment of a computer architecture.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
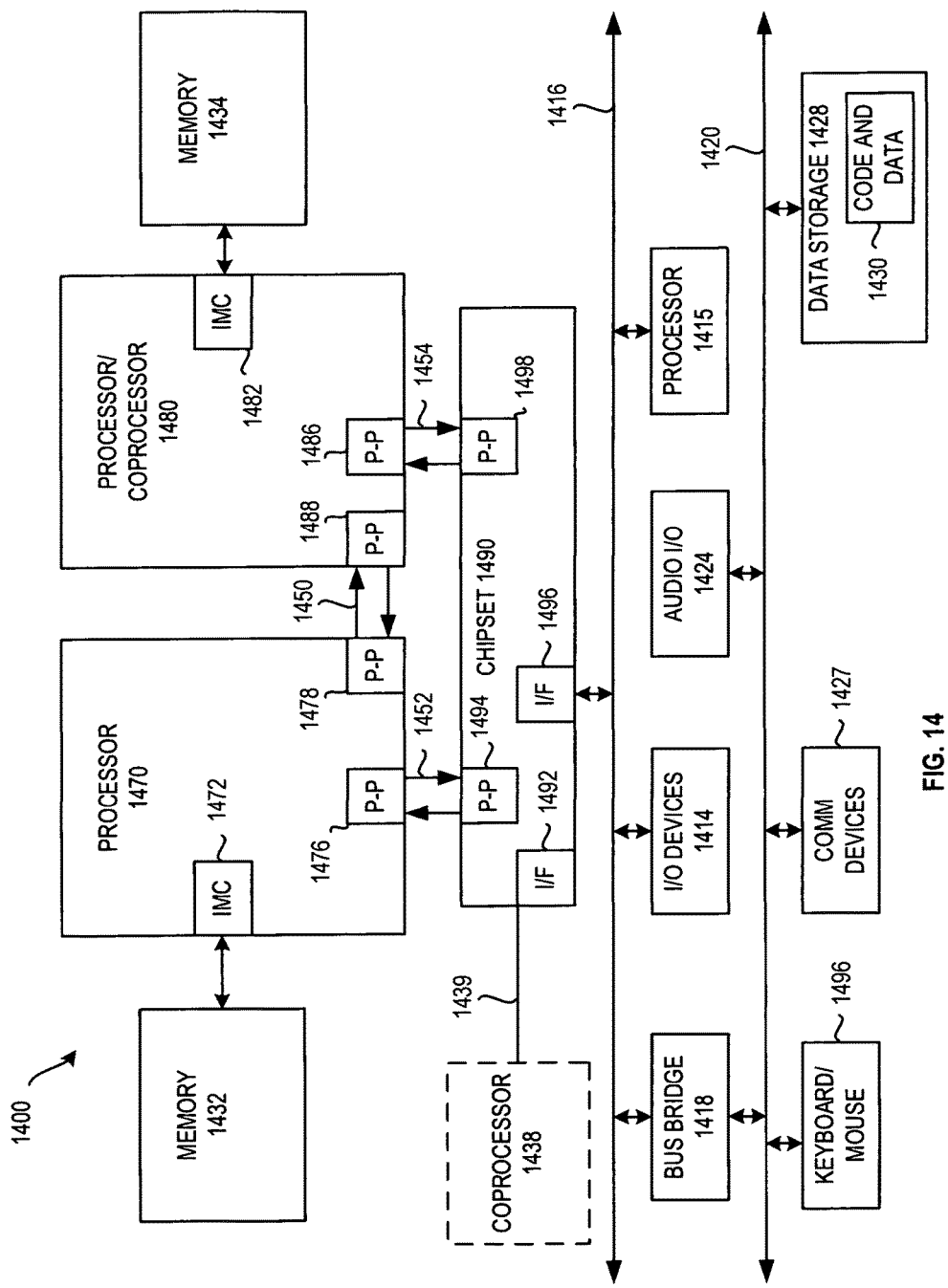
FIG. 14 is a block diagram of a second embodiment of a computer architecture.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 492 and bus 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
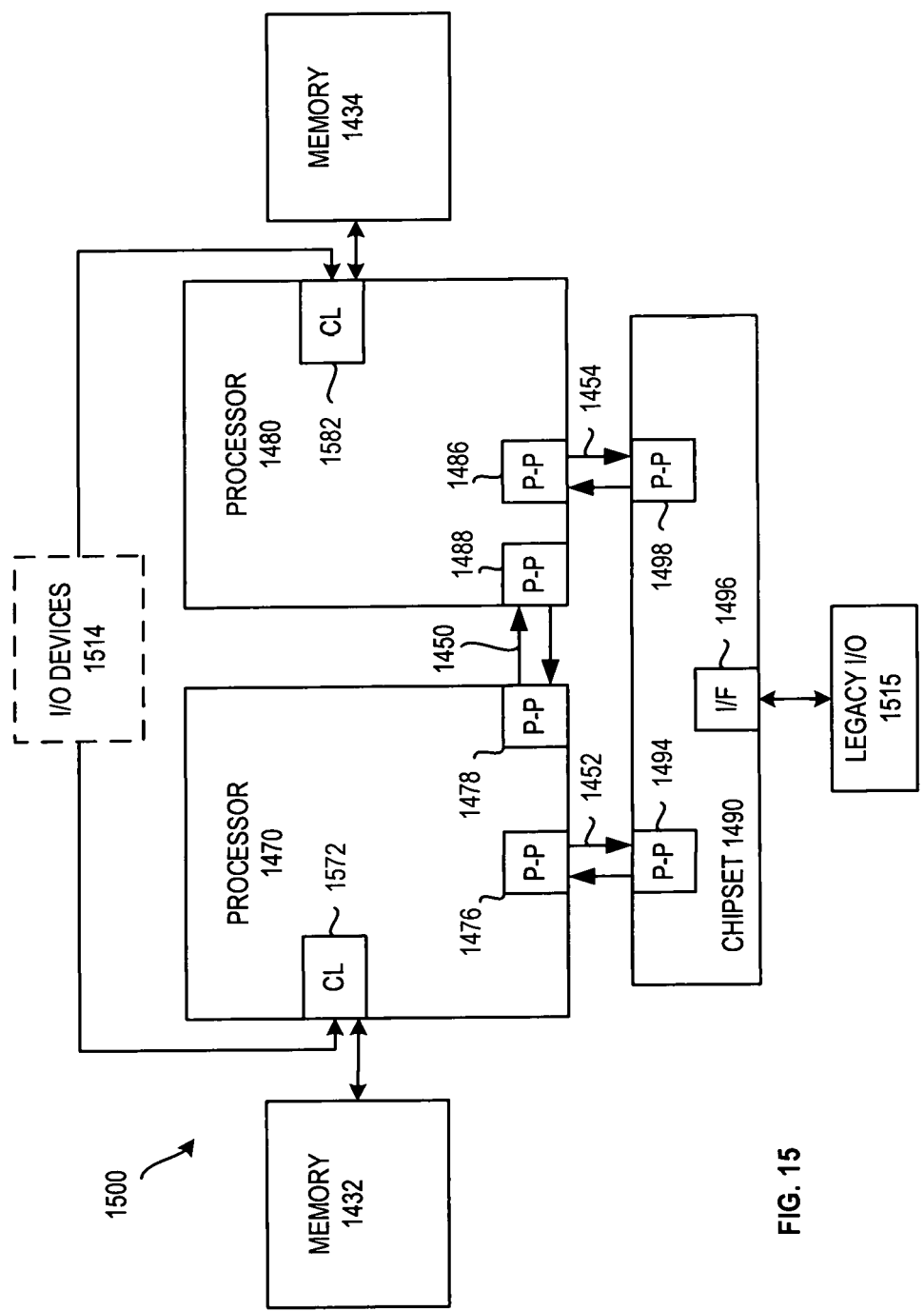
FIG. 15 is a block diagram of a third embodiment of a computer architecture.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 572 and 582, respectively. Thus, the CL 572, 582 include integrated memory controller units and include I/O control logic. FIG. 15 illustrates that not only are the memories 1432, 1434 coupled to the CL 572, 582, but also that I/O devices 1514 are also coupled to the control logic 572, 582. Legacy I/O devices 1515 are coupled to the chipset 1490.

Figure 16:
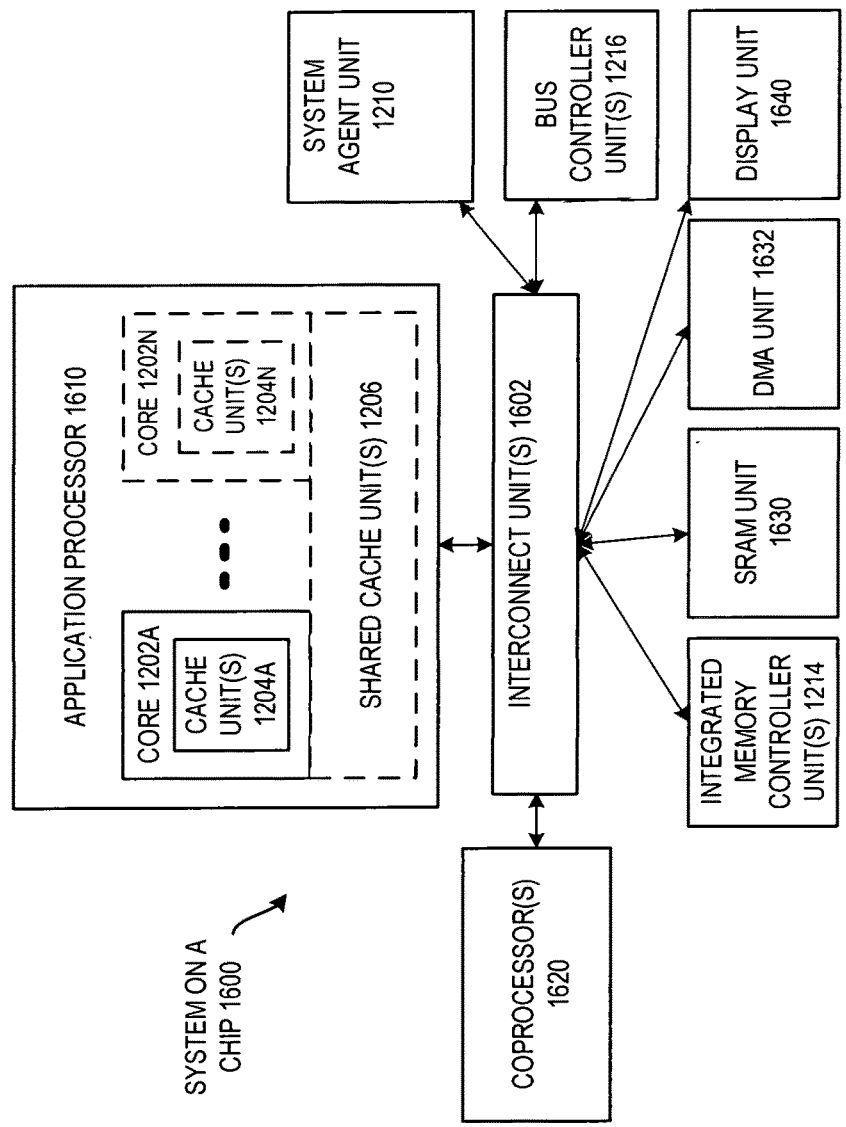
FIG. 16 is a block diagram of an embodiment of a system-on-a-chip architecture.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
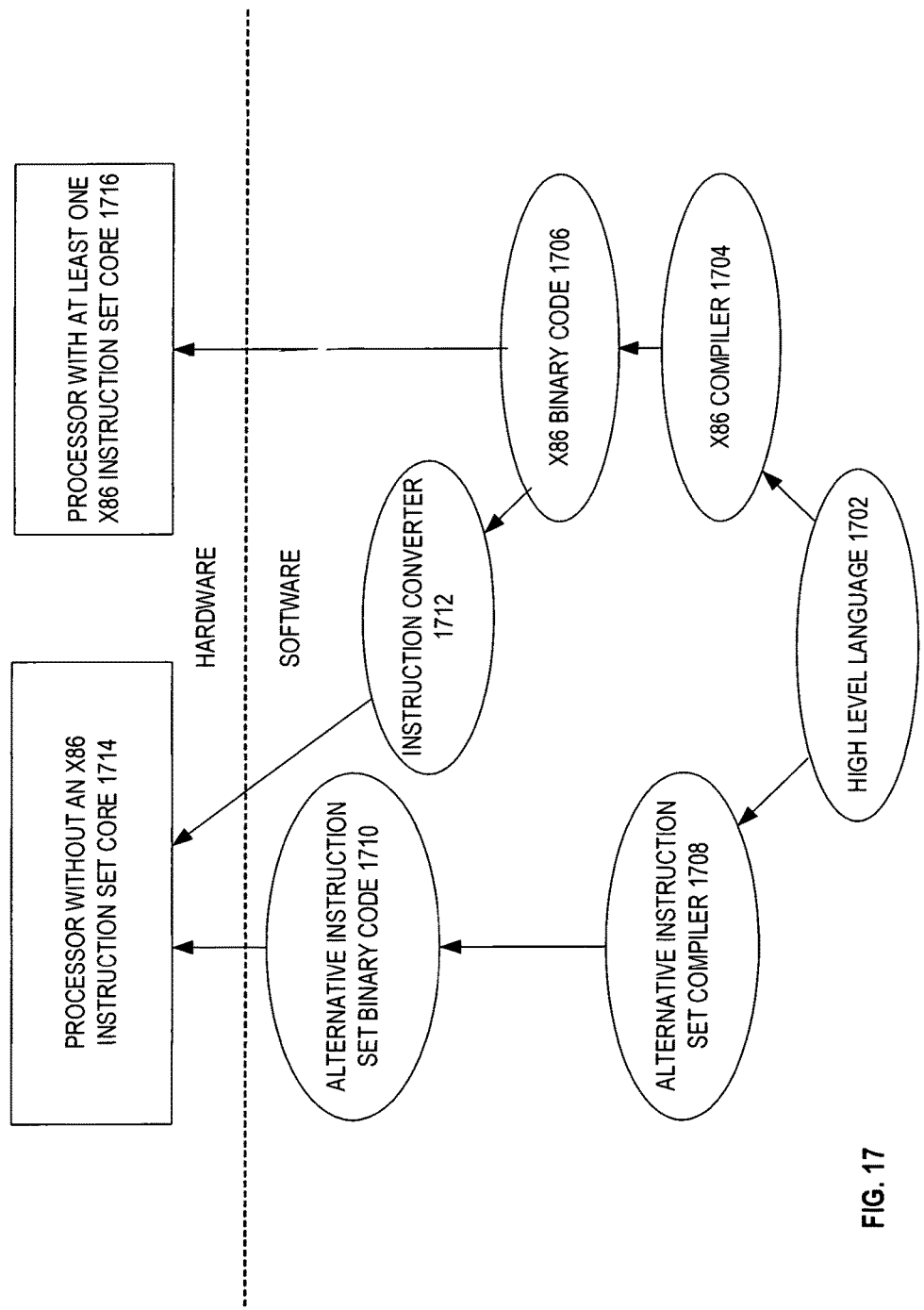
FIG. 17 is a block diagram of use of a software instruction converter to convert binary instructions in a source instruction set to binary instructions in a target instruction set, according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Components, features, and details described for any of FIGS. 1, 4-6, and 9 may also optionally apply to any of FIGS. 2-3. Moreover, components, features, and details described for any of the apparatus may also optionally apply to any of the methods, which in embodiments may be performed by and/or with such apparatus. Any of the processors described herein may be included in any of the computer systems disclosed herein.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, a unit may be coupled with a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor or other apparatus that includes a decode unit to decode a persistent store fence instruction. The apparatus also includes a memory subsystem module coupled with the decode unit. The memory subsystem module, in response to the persistent store fence instruction, is to ensure that a given data corresponding to the persistent store fence instruction is stored persistently in a persistent storage before data of all subsequent store instructions, which occur after the persistent store fence instruction in original program order, is stored persistently in the persistent storage.

Example 2 includes the processor of Example 1, optionally in which the persistent store fence instruction includes a store and persistent store fence instruction that is to indicate a source operand having the given data and that is to indicate a location in the persistent storage where the given data is to be stored.

Example 3 includes the processor of Example 1, optionally in which the given data is to be included in a source operand of a store instruction that implicitly to the persistent store fence instruction is to be one of immediately before and immediately after the persistent store fence instruction in the original program order.

Example 4 includes the processor of any one of Examples 1 to 3, optionally in which the memory subsystem module, in response to the persistent store fence instruction, is not to ensure that data of all previous store instructions, which occur before the persistent store fence instruction in the original program order, is stored persistently in the persistent storage before the data of the subsequent store instructions.

Example 5 includes the processor of any one of Examples 1 to 3, further including a set of one or more caches. Also, optionally in which the memory subsystem module, in response to the persistent store fence instruction, is to cause the given data to bypass the set of the one or more caches.

Example 6 includes the processor of any one of Examples 1 to 5, further including a persistent store fence buffer, and optionally in which the memory subsystem module, in response to the persistent store fence instruction, is to cause the given data to be stored in the persistent store fence buffer.

Example 7 includes the processor of Example 6, further including persistent store fence buffer management unit to store at least one cache line from the persistent store fence buffer to the persistent storage based on a signal indicative of an intent to remove a cache line from a cache before the cache line is removed from the cache.

Example 8 includes the processor of any one of Examples 6 to 7, optionally in which the persistent store fence buffer includes a write combining buffer that is to allow a second data corresponding to a second persistent store fence instruction to be stored in a same cache line of the persistent store fence buffer as the given data.

Example 9 includes the processor of any one of Examples 6 to 8, optionally in which an instruction set of the processor does not include a user-level load instruction to read data from the persistent store fence buffer.

Example 10 includes the processor of any one of Examples 6 to 9, optionally in which the persistent store fence buffer does not implement a cache coherency protocol.

Example 11 includes the processor of any one of Examples 1 to 6, optionally in which the processor is to store a cache line having the given data and a second data corresponding to a second persistent store fence instruction to the persistent storage in a common set of one or more cycles to be transmitted on an interconnect that is to be used to couple the processor with the persistent storage.

Example 12 is a method in a processor that includes receiving a persistent store fence instruction. The method also includes ensuring, responsive to the persistent store fence instruction, that a given data corresponding to the persistent store fence instruction is stored persistently in a persistent storage before data of all subsequent store instructions, which occur after the persistent store fence instruction in original program order, is stored persistently in the persistent storage.

Example 13 includes the method of Example 12, optionally in which receiving the instruction includes receiving a store and persistent store fence instruction that indicates a source operand having the given data and that indicates a location in the persistent storage where the given data is to be stored.

Example 14 includes the method of Example 12, further including receiving a store instruction indicting a source operand having the given data, optionally in which the store instruction is one of immediately before and immediately after the persistent store fence instruction in the original program order.

Example 15 includes the method of any one of Examples 12 to 14, further including causing the given data to bypass a set of one or more caches of the processor responsive to the persistent store fence instruction.

Example 16 includes the method of any one of Examples 12 to 15, optionally in which ensuring includes ensuring that the given data is stored persistently in the persistent storage before the data of the subsequent store instructions is stored persistently in the persistent storage without ensuring that data of all previous store instructions is stored persistently in the persistent storage before the data of said all subsequent store instructions is stored persistently in the persistent storage. The previous store instructions occur before the persistent store fence instruction in the original program order.

Example 17 includes the method of any one of Examples 12 to 16, further including storing a cache line having the given data and a second data corresponding to a second persistent store fence instruction to the persistent storage in a common set of one or more cycles transmitted on an interconnect.

Example 18 includes the method of any one of Examples 12 to 17, further including storing the given data in a persistent store fence buffer responsive to the persistent store fence instruction. Also, optionally in which an instruction set of the processor does not include a user-level load instruction to load data from the persistent store fence buffer.

Example 19 includes the method of Example 18, further including receiving a signal indicating an intent to remove a cache line from a cache, and storing at least one cache line from the persistent store fence buffer to the persistent storage, after receiving the signal, and before the cache line is removed from the cache to the persistent storage.

Example 20 includes the method of any one of Examples 18 to 19, optionally in which storing the given data in the persistent store fence buffer includes storing the given data in a cache line of the persistent store fence buffer that has second data corresponding to a second persistent store fence instruction.

Example 21 includes the method of any one of Examples 12 to 20, further including storing the given data to a write-ahead log in the persistent memory.

Example 22 is a system to process instructions that includes an interconnect, and a persistent storage coupled with the interconnect. The persistent storage stores a set of instructions of a write-ahead logging algorithm. The set of instructions including a store and persistent store fence instruction that indicates a location in the persistent storage and that is used by the write-ahead logging algorithm to store a given data to a write-ahead log in the persistent storage. The system also includes a processor coupled with the interconnect. The processor is to receive the store and persistent store fence instruction. The processor, in response to the store and persistent store fence instruction, is to ensure that the given data is stored persistently in the persistent storage before data of all subsequent store instructions, which occur after the store and persistent store fence instruction in the write-ahead logging algorithm in original program order, is stored persistently in the persistent storage.

Example 23 includes the system of Example 22, optionally in which the persistent store and persistent store fence instruction includes a non-temporal instruction that is to cause the given data to bypass a set of one or more caches of the processor.

Example 24 is an article of manufacture that includes a non-transitory machine-readable storage medium. The non-transitory machine-readable storage medium stores a store and persistent store fence instruction. The store and persistent store fence instruction is to indicate a source operand that is to have a given data and to indicate a location in a persistent storage where the given data is to be stored. The store and persistent store fence instruction, if executed by a machine, is to cause the machine to perform operations including ensuring that the given data is stored persistently in the persistent storage before data of all subsequent store instructions, which occur after the persistent store fence instruction in original program order, is stored persistently in the persistent storage.

Example 25 includes the article of manufacture of Example 24, optionally in which the store and persistent store fence instruction, if executed by the machine, is not to cause the machine to ensure that data of all previous store instructions, which occur before the store and persistent store fence instruction in the original program order, is stored persistently in the persistent storage before the data of the subsequent store instructions.

Example 26 is a processor or other apparatus that is operative to perform the method of any one of Examples 12 to 21.

Example 27 is a processor or other apparatus that includes means for performing the method of any one of Examples 12 to 21.

Example 28 is a processor or other apparatus that includes modules to perform the method of any one of Examples 12 to 21.

Example 29 is a processor that includes any combination of modules and/or units and/or logic and/or circuitry and/or means for performing the method of any one of Examples 12 to 21.

Example 30 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 12 to 21.

Example 31 is a computer system, other electronic device, or other apparatus including a bus or other interconnect, the processor of any one of Examples 1 to 11 coupled with the interconnect, and at least one component coupled with the interconnect that is selected from a dynamic random access memory (DRAM), a network interface, a graphics chip, a wireless communications chip, a Global System for Mobile Communications (GSM) antenna, a phase change memory, and a video camera.

Example 32 is a processor or other apparatus substantially as described herein.

Example 33 is a processor or other apparatus that is operative to perform any method substantially as described herein.

Example 34 is a processor or other apparatus that is operative to perform any persistent store fence instruction substantially as described herein.

The invention claimed is:

1. A processor comprising:
a decode unit to decode a given persistent store fence instruction; and
a memory subsystem coupled with the decode unit and including one or more caches and at least one of a store buffer and a memory controller, the decode of the given persistent store fence instruction to cause the memory subsystem to ensure that a given data corresponding to the given persistent store fence instruction is stored persistently in a persistent storage before data of all subsequent store instructions, which occur after the given persistent store fence instruction in original program order, is stored persistently in the persistent storage, wherein the decode of the given persistent store fence instruction is not to cause the memory subsystem to ensure that data of any previous store instructions not used to store the given data, which occur before the given persistent store fence instruction in the original program order, is stored persistently in the persistent storage before the data of the subsequent store instructions, even when there is at least one such previous store instruction not used to store the given data between the given persistent store fence instruction and a most recent previous persistent store fence instruction.

2. The processor of claim 1, wherein the given persistent store fence instruction comprises a store and persistent store fence instruction that is to indicate a source operand having the given data and that is to indicate a location in the persistent storage where the given data is to be stored.

3. The processor of claim 1, wherein the given data is to be included in a source operand of a store instruction that implicitly to the given persistent store fence instruction is to be one of immediately before and immediately after the given persistent store fence instruction in the original program order.

4. The processor of claim 1, wherein the memory subsystem, in response to the given persistent store fence instruction, is to cause the given data to bypass the one or more caches.

5. The processor of claim 1, further comprising a persistent store fence buffer, and wherein the memory subsystem, in response to the given persistent store fence instruction, is to cause the given data to be stored in the persistent store fence buffer.

6. The processor of claim 5, further comprising a persistent store fence buffer management unit circuit to store at least one cache line from the persistent store fence buffer to the persistent storage based on a signal indicative of an intent to remove a given cache line from a given cache before the given cache line is removed from the given cache.

7. The processor of claim 5, wherein the persistent store fence buffer comprises a write combining buffer that is to allow a second data corresponding to a second persistent store fence instruction to be stored in a same cache line of the persistent store fence buffer as the given data.

8. The processor of claim 5, wherein an instruction set of the processor does not include a user-level load instruction to read data from the persistent store fence buffer.

9. The processor of claim 5, wherein the persistent store fence buffer does not implement a cache coherency protocol.

10. The processor of claim 1, wherein the processor is to transmit a cache line having the given data and a second data corresponding to a second persistent store fence instruction to the persistent storage together on an interconnect used to couple the processor with the persistent storage.

11. A method in a processor comprising:
receiving a given persistent store fence instruction; and
ensuring, responsive to the given persistent store fence instruction, that a given data corresponding to the given persistent store fence instruction is stored persistently in a persistent storage before data of all subsequent store instructions, which occur after the given persistent store fence instruction in original program order, is stored persistently in the persistent storage, without ensuring that data of any previous store instructions not used to store the given data, which occur before the given persistent store fence instruction in the original program order, and between the given persistent store fence instruction and a most recent previous persistent store fence instruction, is stored persistently in the persistent storage before the data of said all subsequent store instructions is stored persistently in the persistent storage, even when there is at least one such previous store instruction not used to store the given data.

12. The method of claim 11, wherein receiving the given persistent store fence instruction comprises receiving a store and persistent store fence instruction that indicates a source operand having the given data and that indicates a location in the persistent storage where the given data is to be stored.

13. The method of claim 11, further comprising receiving a given store instruction indicting a source operand having the given data, wherein the given store instruction is one of immediately before and immediately after the given persistent store fence instruction in the original program order.

14. The method of claim 11, further comprising causing the given data to bypass a set of one or more caches of the processor responsive to the given persistent store fence instruction.

15. The method of claim 11, further comprising transmitting a cache line having the given data and a second data corresponding to a second persistent store fence instruction to the persistent storage together on an interconnect.

16. The method of claim 11, further comprising storing the given data in a persistent store fence buffer responsive to the given persistent store fence instruction, wherein an instruction set of the processor does not include a user-level load instruction to load data from the persistent store fence buffer.

17. The method of claim 16, further comprising:
receiving a signal indicating an intent to remove a given cache line from a cache; and
storing at least one cache line from the persistent store fence buffer to the persistent storage, after receiving the signal, and before the given cache line is removed from the cache to the persistent storage.

18. The method of claim 16, wherein storing the given data in the persistent store fence buffer comprises storing the given data in a cache line of the persistent store fence buffer that has second data corresponding to a second persistent store fence instruction.

19. The method of claim 11, further comprising storing the given data to a write-ahead log in the persistent storage.

20. An article of manufacture comprising a non-transitory machine-readable storage medium, the non-transitory machine-readable storage medium storing a store and persistent store fence instruction,
the store and persistent store fence instruction to indicate a source operand that is to have a given data and to indicate a location in a persistent storage where the given data is to be stored, and the store and persistent store fence instruction, if executed by a machine, is to cause the machine to perform operations to:

ensure that the given data is stored persistently in the persistent storage before data of all subsequent store instructions, which occur after the store and persistent store fence instruction in original program order, is stored persistently in the persistent storage, but not ensure that data of all previous store instructions, which occur before the store and persistent store fence instruction and after a most recent store and persistent store fence instruction in the original program order, is stored persistently in the persistent storage before the data of said all subsequent store instructions is stored persistently in the persistent storage, even when there is at least one such previous store instruction.

21. A processor comprising:
a decode unit to decode a given persistent store fence instruction; and
an execution unit coupled with the decode unit, the execution unit, in response to the given persistent store fence instruction, to ensure that a given data corresponding to the given persistent store fence instruction is stored persistently in a persistent storage before data of all subsequent store instructions, which occur after the given persistent store fence instruction in original program order, is stored persistently in the persistent storage, wherein the memory subsystem, in response to the given persistent store fence instruction, is not to ensure that data of all previous store instructions, which occur before the given persistent store fence instruction and after a most recent prior persistent store fence instruction in the original program order, is stored persistently in the persistent storage before the data of the subsequent store instructions.

22. The processor of claim 21, wherein the given persistent store fence instruction comprises a store and persistent store fence instruction that is to indicate a source operand having the given data and that is to indicate a location in the persistent storage where the given data is to be stored.

23. The processor of claim 21, further comprising an instruction fetch unit to fetch the given persistent store fence instruction, and wherein the memory subsystem, in response to the given persistent store fence instruction, is not to ensure that data of any of said all previous store instructions, which occur before the given persistent store fence instruction and after the most recent prior persistent store fence instruction in the original program order, is stored persistently in the persistent storage before the data of the subsequent store instructions, even when there is at least one such previous store instruction.

* * * * *